United States Patent
Zweig

(10) Patent No.: US 7,564,364 B2
(45) Date of Patent: Jul. 21, 2009

(54) MATERIAL LIFETIME DATA ABSTRACTION DEVICE AND METHOD

(76) Inventor: Stephen Eliot Zweig, 224 Vista de Sierra, Los Gatos, CA (US) 95030

( * ) Notice: Subject to any disclaimer, the term of this patent is extended or adjusted under 35 U.S.C. 154(b) by 424 days.

(21) Appl. No.: 11/515,310

(22) Filed: Sep. 1, 2006

(65) Prior Publication Data

US 2007/0001862 A1 Jan. 4, 2007

Related U.S. Application Data

(63) Continuation-in-part of application No. 10/824,709, filed on Apr. 14, 2004, now Pat. No. 7,102,526, which is a continuation-in-part of application No. 10/634,297, filed on Aug. 5, 2003, now Pat. No. 6,950,028.

(60) Provisional application No. 60/465,434, filed on Apr. 25, 2003, provisional application No. 60/502,834, filed on Sep. 12, 2003, provisional application No. 60/506,814, filed on Sep. 26, 2003.

(51) Int. Cl.
*G08B 17/00* (2006.01)
(52) U.S. Cl. ............... 340/588; 340/584; 340/572.1; 702/130
(58) Field of Classification Search ............... 340/588, 340/584, 585, 5.1, 5.9, 5.92, 572.1; 702/99, 702/104, 130
See application file for complete search history.

(56) References Cited

U.S. PATENT DOCUMENTS

| | | | |
|---|---|---|---|
| 4,538,851 A | 9/1985 | Taylor | |
| 5,313,848 A | 5/1994 | Santin et al. | |
| 5,552,999 A * | 9/1996 | Polgreen et al. | 702/63 |
| 5,667,303 A | 9/1997 | Arens et al. | |
| 5,867,809 A * | 2/1999 | Soga et al. | 702/130 |
| RE36,200 E | 4/1999 | Berrian et al. | |
| 6,217,213 B1 | 4/2001 | Curry et al. | |
| 6,320,512 B1 | 11/2001 | Nicholson et al. | |
| 6,544,925 B1 | 4/2003 | Prusik et al. | |
| 6,950,028 B2 * | 9/2005 | Zweig | 340/588 |
| 7,091,861 B2 | 8/2006 | Schmidtberg et al. | |
| 7,240,845 B2 * | 7/2007 | Komine et al. | 235/492 |

FOREIGN PATENT DOCUMENTS

WO    WO0125472 A1    4/2001

OTHER PUBLICATIONS

U.S. Appl. No. 11/112,718, filed Apr. 22, 2005, Pope, et al.

\* cited by examiner

*Primary Examiner*—Anh V La

(57) ABSTRACT

This invention covers improved electronic time-temperature indicators with an RFID output, and other devices and methods by which the thermal history of a complex material, which may not obey a simple exponential Arrhenius law degradation equation, may be monitored, and the subsequent fitness for use of the tracked material may be quickly ascertained. In particular, the invention discloses a rapidly reprogrammable electronic time-temperature RFID tag that may be easily customized with the thermal time-temperature stability profile of an arbitrary material, using electronic data transfer methods. Using this device, a single, low-cost, generic time-temperature tag may be mass-produced, and then subsequently programmed to mimic the stability characteristics of nearly any material of interest. By utilizing data compression to compress a material's extensive thermal history into the small user data field transmitted by modern RFID tags, a considerable amount of information relating to product status and cause of failure may be rapidly transmitted within the small memory confines of standard RFID tag protocols.

26 Claims, 10 Drawing Sheets

Figure 3
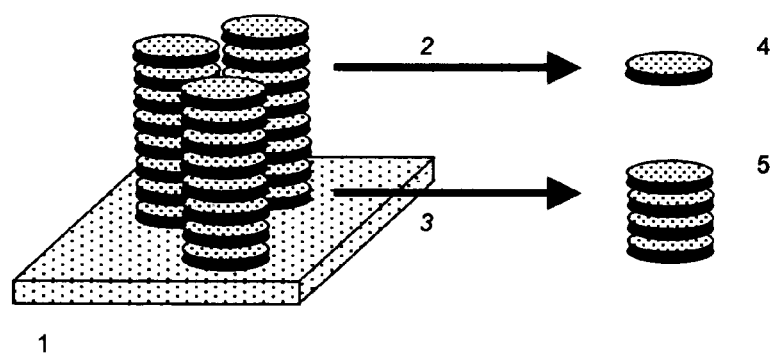
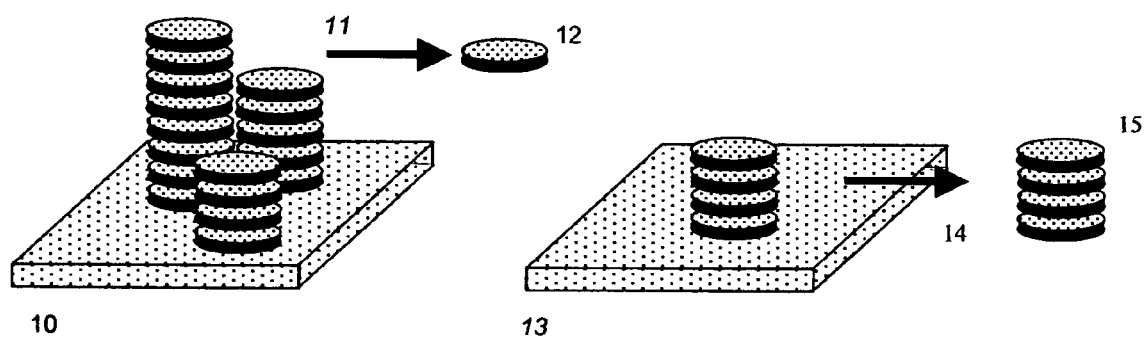

Figure 6
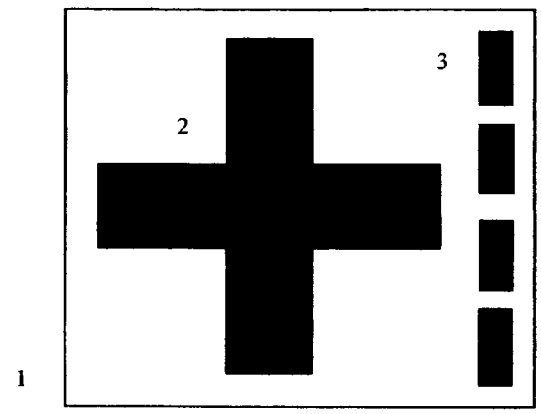
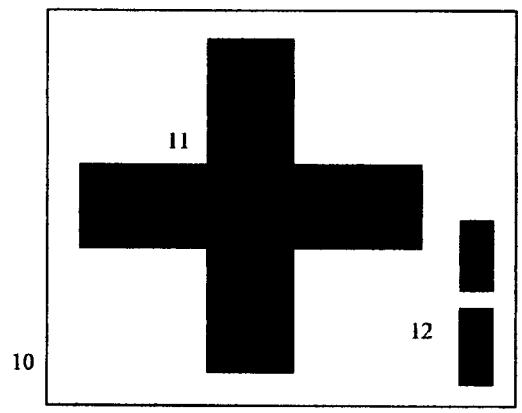
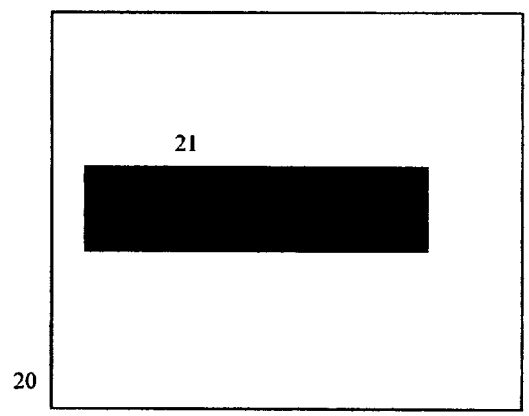
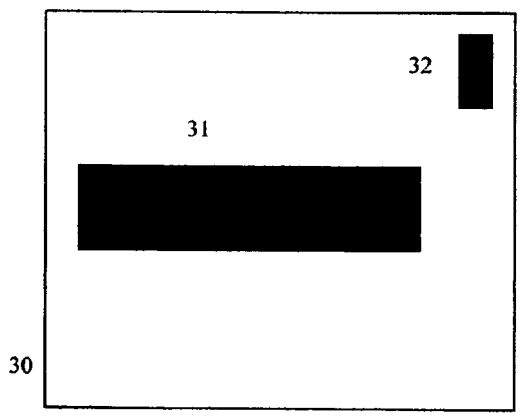
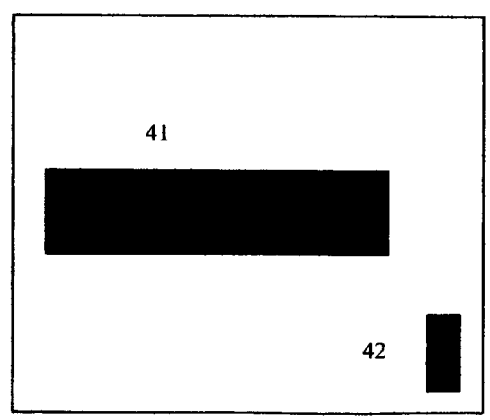

Figure 8

```
------------------------------------------------------------------------
                                    1
                                  /      2
Thu Apr  8 21:38:25 2004         /      /  3
                                /      /
Cefepime  , ID Code:  4640001  /      /
                                     /
Security code: 8995,  Checksum: 6670 vs 6670 OK Status: EXPIRED ──── 4                       5                            6
                                          /                            /
Hours elapsed since LifeTrack start: 52
Hours run before expiration: 11, Average temperature: 29.2 +/- 5.5 C
Hours run since expiration:  41, Average temperature: 25.2 +/- 0.6 C 7
Temperature logger (degrees C):                             /
Logger frequency: 0.5 hours, total logger time: 11.5 hours                8
                                                                         /
Temperatures recorded before expiration:                                /
[-  52.5 hr.]    0,    0,    0,    0,   0,   0,   0,  37,  40,  41,   /
[-  47.5 hr.]   41,   41,   41,   40,  40,  41,  40,  41,  41,  40,
[-  42.5 hr.]   40,   40,   41,
                                                                          9
Logger expired on Wed Apr  7 04:38:25 2004 (local time), 41 hours ago. /

------------------------------------------------------------------------
```

US 7,564,364 B2

MATERIAL LIFETIME DATA ABSTRACTION DEVICE AND METHOD

This application is a continuation in part of, and claims the priority benefit of, U.S. patent Ser. No. 10/824,709 "Electronic time-temperature indicator and logger", filed Apr. 14, 2004, (issuing as U.S. Pat. No. 7,102,526). The Ser. No. 10/824,709 application was a continuation in part of application Ser. No. 10/634,297 "Electronic time-temperature indicator, filed Aug. 5, 2003, since issued as U.S. Pat. No. 6,950,028. The Ser. No. 10/634,297 application in turn claimed the priority benefit of provisional patent application 60/465,434, "Electronic time-temperature indicator", filed Apr. 25, 2003; and provisional patent applications 60/502,834 and 60/506,814, "Electronic time-temperature monitor and logger", filed Sep. 12, 2003 and Sep. 26, 2003.

BACKGROUND OF THE INVENTION

1. Field of the Invention

The invention teaches methods to efficiently compress and abstract sensor information from electronic time-temperature indicators, monitors, and loggers. The invention is particularly useful for electronic time-temperature devices with an RFID (radio frequency) output, as well as other devices that monitor the thermal history of a material, and automatically determine the material's fitness for use.

2. Description of the Related Art

Many materials in use in commerce, medicine, and other areas are perishable. That is, the materials have a tendency to deteriorate with time, and this tendency to deteriorate is often accelerated by exposure to higher temperatures. This tendency to deteriorate is often designated as a material's "stability". A material that deteriorates slowly in response to higher temperatures over long periods of time is said to have a "high stability". By contrast, a material that deteriorates quickly in response to higher temperatures is said to have a "low stability".

For simple materials, thermal degradation processes are usually well characterized by the well-known Arrhenius equation:

$$k = Ce^{\left(\frac{-E}{RT}\right)} \quad (1)$$

Here k is the rate of deterioration, C is a constant, E is the activation energy of the reaction, R is the universal gas constant, and T is the temperature in degrees Kelvin.

For more complex materials, however, the simple Arrhenius equation is often not sufficient. Complex materials can be composed of many different molecular entities, each with different activation energies and possibly different phase transition temperatures. As a result, the thermal degradation curve for more complex materials can often be a relatively complex function, which may have inflection points, sharp transitions, and other significant deviations from Arrhenius equation (1).

Examples of deterioration includes spoilage in the case of biological materials, loss of potency in the case of drugs, loss of chemical reactivity in the case of chemicals, or alternatively formation of unwanted contaminants. Excessive deterioration eventually results in the material in question being rendered unfit to use, or even rendered dangerous. Thus for commerce, medicine, and other areas, the rapid detection of materials rendered unfit to use by an unacceptable thermal history is very important.

Additionally, there are alternative situations where a material must undergo a certain minimal thermal history before it becomes fit for use. There are many materials, and material treatment processes, commonly used for construction, manufacturing, food preparation, post harvest agricultural material processing, pharmaceutical preparation, as well as concrete setting, epoxy hardening, biological fermentation, ripening, cooking, pasteurization, sterilization and the like, where the material needs to be properly cured, incubated, or heat treated before the material is fit to use. Since curing, incubation, or heat treatment processes are often temperature dependent, typically taking longer to proceed at lower temperatures, such materials must undergo a certain minimal time-temperature history before they are fit for use.

As a result, visual time-temperature indicators (TTI) are widely used in many areas of commerce. These are typically small devices that are affixed to a container of thermally sensitive material. The TTI shares the same thermal history as the material, and gives the user a visual warning if the material has had an improper thermal history.

Visual time-temperature indicators are often used to verify that a perishable, temperature sensitive, product has been transported from the manufacturer to the user via a transport process that has preserved the "cold chain". Here, a "cold chain" means a continuous system for conserving and preserving materials at precise refrigerated temperatures from production to use, so that the integrity of the materials is assured.

There are several different types of visual time-temperature indicator in present-day use. These are chemically based, and follow the simple exponential Arrhenius decay equation. As previously discussed, however, one drawback of such Arrhenius decay type indicators, is that not all materials follow simple Arrhenius decay kinetics throughout all temperature ranges of interest. As a result, prior-art TTI cannot adequately monitor all materials.

FIG. 1 shows a graph of the stability of a material with a simple Arrhenius decay curve (1), and a material with a more complex decay curve (2). Here the curved exponential Arrhenius decay equation has been linearized by plotting 1/(Temperature) in degrees Kelvin on the "X" axis, versus the logarithm of the material's lifetime (in hours) at various temperatures on the "Y" axis. Note that although material (1) can be successfully monitored with a simple (i.e. linear function in 1/Temperature vs. log lifetime plots) Arrhenius-curve TTI (3); material (2) requires a more sophisticated TTI (4) capable of accurately reproducing more complex (i.e. non-linear function in 1/Temperature vs. log lifetime plots) thermal degradation curves. Prior to the present invention, however, no such sophisticated visual TTI devices (4) existed.

For the purposes of this discussion, "simple" temperature functions (or stability curves) are defined as exponential Arrhenius curves that produce a line with a single defined slope and intercept when the temperature function is plotted on 1/(Temperature ° K) versus log (lifetime) plots; and "complex" temperature functions (or stability curves) are defined as functions that produce curves, or higher order shapes when the temperature function is plotted on 1/(Temperature ° K) versus log (lifetime) plots, such that a single slope and intercept is inadequate to describe the resulting plot.

There are several different brands of visual Arrhenius-type time-temperature indicators in current use. For example, TempTime Corporation, Morris Plains, N.J., produces the Heatmarker® Time-temperature indicator for medical use. This indicator, often used to insure the integrity of vaccines in third-world countries, relies upon the progressive darkening of a chemical indicator, normally placed in the center of a "bulls eye" visual colorimetric reference pattern. Upon initial production, the chemical indicator is light in color, and the center of the "bulls eye" is lighter than the surrounding area. However upon exposure to an excessive amount of temperature for an excessive amount of time, the center of the bull's eye becomes darker than the surrounding area. A user may thus quickly and easily assess the integrity of any material associated with the indicator by simply noting if the center of the bulls eye is lighter or darker than the surrounding colorimetric reference material.

The chemistry techniques underlying this methodology is disclosed by Baughman et. al. in U.S. Pat. No. 4,389,217, Prusik et. al. in U.S. Pat. No. 6,544,925; and in other patents.

An alternative chemically based visual time-temperature indicator is the MonitorMark™ indicator, produced by the 3M corporation, Saint Paul, Minn. The MonitorMark uses a wicking material, along with a colored indicator that slowly migrates up the wick at a rate that is dependent on time and temperature. The user may thus quickly ascertain how far up the wick the colored indicator has migrated, and quickly assess if the material associated with the time-temperature indicator is fit to use.

The chemistry techniques underlying this technology is disclosed by Arens et. al. in U.S. Pat. No. 5,667,303, and in subsequent patents.

There are other types of time-temperature indicator that do not produce a visible output, but rather require the use of instruments to interrogate the indicator, and determine the state of the indicator. For example, the Bioett Corporation, Sweden, produces a radio frequency identification (RFID) non-visual time-temperature indicator. This indicator combines a passive RFID unit with an Arrhenius type, enzyme based, degradable circuit component, such that as the indicator is exposed to excessive amounts of temperature for excessive amounts of time, the RFID signature of the tag changes.

The techniques underlying this methodology are disclosed by Sjoholm et. al. in WIPO application WO0125472A1.

Although this approach lends itself to very low cost time-temperature sensors, the lack of visual output is inconvenient for most users, who typically are not equipped with sophisticated RFID reading equipment. As a result, users without this specialized equipment will be unable to ascertain the status of the sensor. An additional drawback of Sjoholm et. al. is that the precise stability characteristics of this device are dependent upon tuning the specific degradation of a chemically based (enzymatic) Arrhenius type time-temperature sensor to match the degradation characteristics of an arbitrary product. This is a time-consuming and burdensome process that may not always result in a precise stability match between the characteristics of the chemical time-temperature indicator, and the characteristics of the monitored material.

U.S. Pat. No. 7,091,861 discloses an RF identification tag for communicating condition information associated with an item. In this technique, a condition of an item, such as it's shelf life, is electronically monitored. The information from this electronic monitoring is used to vary the electronic product code (EPC) associated with the product in an RFID tag. The drawback of this approach is that storage life is a dynamic continuously changing variable, and it rapidly becomes infeasible to communicate all of the relevant shelf life data, and all of the relevant time-temperature history data associated with deteriorated shelf-life, in the relatively small number of bits allocated to the EPC portion of an RFID tag. Further, users will generally prefer to have the item identification number output separately from shelf-life data.

Pope et. al. disclose a shelf-life monitoring sensor-transponder system in U.S. patent application Ser. No. 11/112,718. This system teaches an RFID tag that monitors a perishable material and accumulates time-temperature data, and then passes this data to an RFID tag reader device. The RFID tag reader device has a freshness monitoring memory module which contains data on the material's specific time-temperature sensitivity characteristics. The RFID tag reader processes the downloaded RFID tag time-temperature data using information on the material's specific sensitivity obtained from the RFID tag reader memory module. The RFID tag reader then assigns a remaining lifetime or freshness value to the material. The general approach is somewhat similar to that of Soga et. al. (U.S. Pat. No. 5,867,809).

In addition to time-temperature indicators, which integrate time and temperature, and then make some sort of internal judgment as to if the unit has exceeded some preset criteria, there are a number of time-temperature data logging devices on the market. These logging devices typically store a record of the temperature history of the logger, and make the detailed history available for download to the user. However data loggers of prior art do not attempt to interpret this detailed history. Thus for prior art data logger devices, the interpretation of the relatively long and complex table of time and temperature log entries generated by the logger usually requires downloading the data, followed by a relatively sophisticated analysis by the user. It is clear that such devices impose a considerable burden on unsophisticated users, who simply want to quickly know if the material associated with the device is appropriate for use or not.

One example of a prior art data logger device is the Dallas Semiconductor Button Thermochron series of temperature logger products. This data logger consists of a roughly ¾ inch diameter metal button that contains an internal battery, thermocouple, microprocessor, and data storage means. The iButton takes up to one million temperature readings over a time period of up to ten years, and stores these readings in its internal memory. Users may access the data by making electrical contact with the iButton through its 1-Wire electrical interface, and downloading the data into a computerized reader. This data then may be manipulated as the user desires, and assessments of the degradation status of the associated product may subsequently be made after additional analysis.

The techniques underlying these methods are taught by Curry et. al. in U.S. Pat. No. 6,217,213.

Other data loggers are also on the market. These include the HOBO time-temperature data logger produced by Onset Computer Corporation, Pocasset, Mass., and others. As does the Thermochron product, these other data loggers also acquire data from temperature sensors, store the data and time in an onboard memory, and make the data available for download and subsequent analysis by sophisticated users.

Electromechanical data loggers are also on the market. For example, the Monitor In-transit temperature recorder, produced by Monitor Co, Modesto, Calif. uses a battery operated, quartz-controlled clock motor to move a small strip of chart recorder paper past a bimetallic, temperature responsive, scribe to produce a visual strip-chart containing a detailed record of the thermal profile of the unit.

Another type of device is the temperature alarm. An example of this later type of device is the TagAlert® monitor, produced by Sensitech Corporation, Beverly Mass. This is a small electronic device, with a microprocessor, temperature sensor, battery, and display all enclosed in a single case. The device can be factory customized to notify the user if the device has exceeded any one of 4 preset alarm conditions, such as temperature went too low, temperature went too high, total time spent at a pre-determined first temperature is too long, and/or total time spent at a pre-determined second temperature is too long. The device may be customized to respond to this narrow set of temperature alarm values, and pre-determined temperature-time alarm values.

The technology behind the TagAlert monitor was originally disclosed by Berrian et. al., U.S. Pat. No. 5,313,848; and subsequently reexamined and reissued as Re. 36,200.

In the broadest form, the device of Re 36,200 is a system, with an enclosed temperature sensor, which generates a time series of temperature measurements, stores some of the past time and temperature measurements, and uses some of these stored temperature measurements to generate an output signal. Re 36,200 differs from prior art electronic digital thermometers which also perform time series signal processing, and which also have digital memories of past readings, such as those taught by U.S. Pat. No. 4,536,851, in that the temperature sensor of Re 36,200 is enclosed in a housing, rather than on the surface of the housing or outside of the housing. In this respect, Re 36,200 has some aspects in common with electronic digital temperature controllers for portable medical instrumentation.

More specifically, however, the device of Re 36,200 may be viewed as a limited type of integrating time-temperature indicator, in that this device uses a sensor (isolated and protected from the external environment by a housing that also contains the other circuit components) to generate the time integral of temperature outside of an acceptable range, or above or below a predetermined threshold temperature, and store or otherwise make use of this value for output purposes.

Although the device of Re 36,200 teaches displaying a visual output means, the system has a number of drawbacks. In particular, the method is generally incapable of realistically modeling (or simulating) material thermal stability profiles, and thus is prone to generate inaccurate results.

Re 36,200 teaches a device that is essentially programmed by four parameters (the upper and lower acceptable temperature, the upper acceptable time value, and the lower acceptable time value). This method is very simplistic, however. The method assumes, for example, that no thermal changes occur between the upper and lower acceptable range conditions. Additionally, the method assumes that beyond the acceptable range limits, (at least up until an optional set of instantaneous temperature "stop" limits), all degradation occurs at the same rate regardless of temperature. As will be discussed in more detail later on, most materials have much more complex thermal degradation profiles, and are poorly monitored by such simplistic approaches.

Because of this lack of proper thermal modeling, for the purposes of this patent, the art of RE 36,200 will be designated as a "thermal alarm". This nomenclature is consistent with the unit's commercial designation (TagAlert®).

The prior art for time-temperature indicators thus may be separated into three main types. One type consists of visual indicators, which use chemical means to mimic the Arrhenius degradation characteristics of a material of interest. These visual indicators may be directly interrogated by unsophisticated users using no additional equipment, and impose no significant analytical burden on the recipient of the material of interest.

The second type consists of non-indicating electronic time-temperature monitors, and electronic data loggers. This second type also monitors the time and temperature by chemical or electronic means, but does not output the data in a manner that is readily accessible to unsophisticated users without additional equipment. Rather, this second class of electronic device requires specialized reading equipment, and may additionally require sophisticated data analysis on the part of the recipient of the material of interest.

The third type consists of electronic time-temperature alarms. This device, exemplified by the Sensitech TagAlert® monitor, does not attempt to integrate the progressive effects of time and temperature over all probable thermal histories, but rather simply informs the user in the event that a limited number (absolute low, time 1 at low 1 exceeded, time 2 at high 2 exceeded, absolute high) of predetermined time-temperature excursions have taken place. U.S. Pat. No. 6,320,512 teaches similar time-temperature alarm methods, using circuit methods similar to those taught by Texas Instruments (MSP430 family Software Users Guide, 1994, p 9-18 to 9-21; MSP430 Family, Metering Application Report, 1997, p 42-45) and others.

Such devices are useful for monitoring conditions during shipping, such as determining if shipment ice packs have melted, detecting if a shipping container has been exposed to temperatures over 50° C., or detecting other standard shipping faults, but are less useful for monitoring the individualized stability profiles of arbitrary materials. Radio-frequency based time-temperature indicators of the prior art, such as the previously mentioned device of Sjoholm et. al. (WO0125472A1), which contain Arrhenius based chemical timers, have many of the same accuracy drawbacks as chemically based visual indicators.

As a result of deficiencies in prior art TTIs, the present practice is to be conservative. That is, chemical time-temperature indicators are usually set to degrade more quickly than the material of interest. Although this scenario will insure that the user does not inadvertently accept degraded material, it is inefficient. In many cases, material that is, in fact, still good may be inappropriately discarded due to poor time-temperature indicator accuracy. Of course, the alternative scenario, in which the chemical time-temperature indicator fails to adequately warn that the tracked material is degraded, is both unacceptable and potentially dangerous.

By contrast, electronic data loggers have a different set of problems. Although these devices collect a full set of accurate time-temperature data, which may be used to determine if a material is acceptable or not, the data is in a difficult to interpret form. As previously discussed, many or most material recipients are unsophisticated, and are unlikely to have the equipment or specialized knowledge in order to read an electronic device, or to interpret a complex chart-recorder graphical output. As a result, many unsophisticated users, receiving material associated with an unreadable or hard-to-read electronic tag, are likely to ignore the tag altogether. As a result, users may inadvertently use material that has been degraded by an unacceptable thermal history.

The temperature alarms of the prior art, such as US Re. 36,200, also are not ideal. These alarms can only be adjusted to trigger on a limited set of fixed unacceptable temperature for a fixed unacceptable time combinations. They are not well suited to accurately mimic the stability characteristics of arbitrarily selected materials. As a result, they have a tendency to either trigger too soon, or too late, which can result in either waste, or inadequate warning.

SUMMARY OF THE INVENTION

The present invention discloses an improved unitized electronic time-temperature indicator or monitor, which may have a simple visual output, RFID output, or both. This indicator may be easily and precisely customized to match the particular time-temperature decay (or curing) profile of an arbitrary material of interest. The material need not follow simple exponential Arrhenius decay characteristics, but rather can have a complex stability curve with many points of inflection, sharp cut-offs, and even phase transition effects. By means of this invention, the thermal degradation (or alteration) characteristics of an arbitrary material may be precisely characterized, and the results of this precise characterization almost instantly downloaded into a mass-produced, low-cost, generic time-temperature unit. This indicator unit may then be associated with the particular material that it is customized for, and used to monitor the material's subsequent thermal history throughout the material's entire lifetime.

After the material has been exposed to an unknown set of thermal environments for various durations, the fitness for use of the material may then be instantly assessed. Using the device and methods of the present invention, a user will need to only glance at the indicator, or run it by a standard RFID tag reader that does not need to have any prior knowledge of the material's time temperature stability characteristics, or any connection to a database containing the material's time-temperature stability characteristics. The display or RFID output of the indicator will quickly and accurately show if the material is still acceptable or not, without subjecting the user to the burden of having to use extra analytical equipment or perform sophisticated data analysis. Additionally, the display or RFID output may optionally disclose the approximate storage life remaining on the material, or optionally show the probable cause as to why the material has expired.

The present disclosure further teaches the advantages of using the data structures associated with state-of-the art RFID tags, such as the EPCglobal Gen-2 standards. In addition to data fields associated with the standard product identification electronic product code (EPC), modern Gen-2 tags, and other modern RFID tags, also allocate memory space for a user data field. Although these user data fields are typically quite small (usually in the 16-bit to 256-bit range), the present disclosure further teaches how, by taking advantage of the shelf-life calculation methods of the present disclosure, these limited user data fields may be efficiently utilized to convey both storage life status, and a remarkably detailed log of key milestones in the product's storage history.

As will be discussed, the methods of the present disclosure teach a generic way of encoding storage lifetime data into the RFID user data field. These methods will work with essentially any type of material. The practical impact of this is that the RFID tag reader device used to read the RFID tag does not need to have any preexisting knowledge of any particular materials' specific stability characteristics. Rather, the techniques of the present disclosure, if standardized, would allow many different manufacturers' brands of RFID tag reader devices to work with many different manufacturers' brands of RFID tags. These different RFID tags could, in turn, work with essentially any type of perishable material. This technique thus offers the advantage allowing both standardization and great flexibility, which should make this approach quite cost effective for high volume implementation.

The devices of the present disclosure are "unitized" in that both the sensors and the lifetime interpretation means of the system are contained in a single hand-held unit. Those devices with visual displays may operate without the need of any additional components, or external connections to other analytical or computational systems. Those devices with RFID output may work with RFID readers that, as previously discussed, do not contain any preexisting knowledge of the material's time-temperature stability characteristics.

BRIEF DESCRIPTION OF THE DRAWINGS

FIG. 3: Illustration of the basic algorithm used in the device

FIG. 6: Illustration of a preferred display configuration

FIG. 8: Example of statistical data downloaded from the device

DETAILED DESCRIPTION OF THE INVENTION

Figure 1:
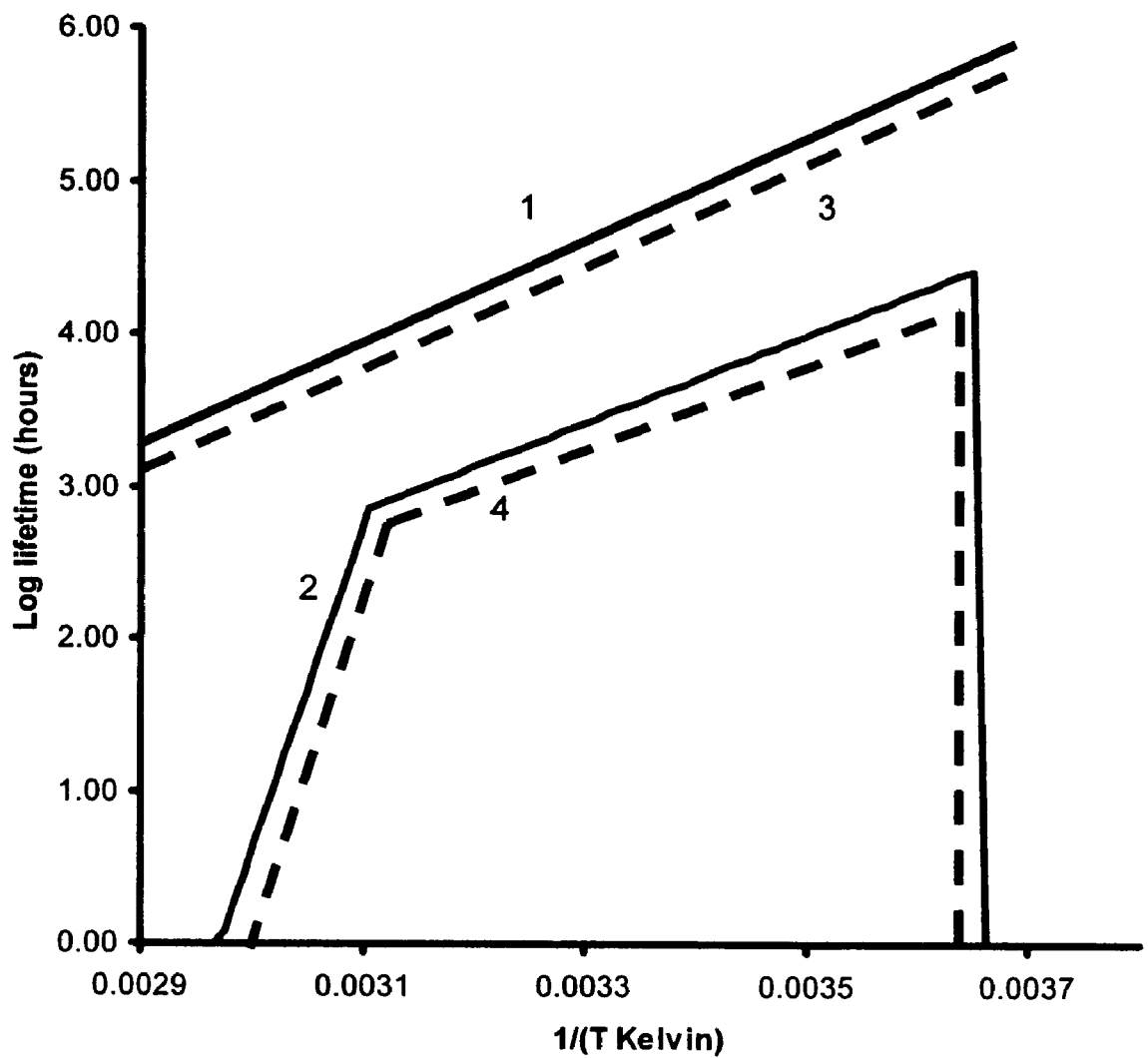
FIG. 1: Graph showing Arrhenius and non-Arrhenius thermal decay curves, along with TTI appropriate for monitoring such decay curves.
Figure 2:
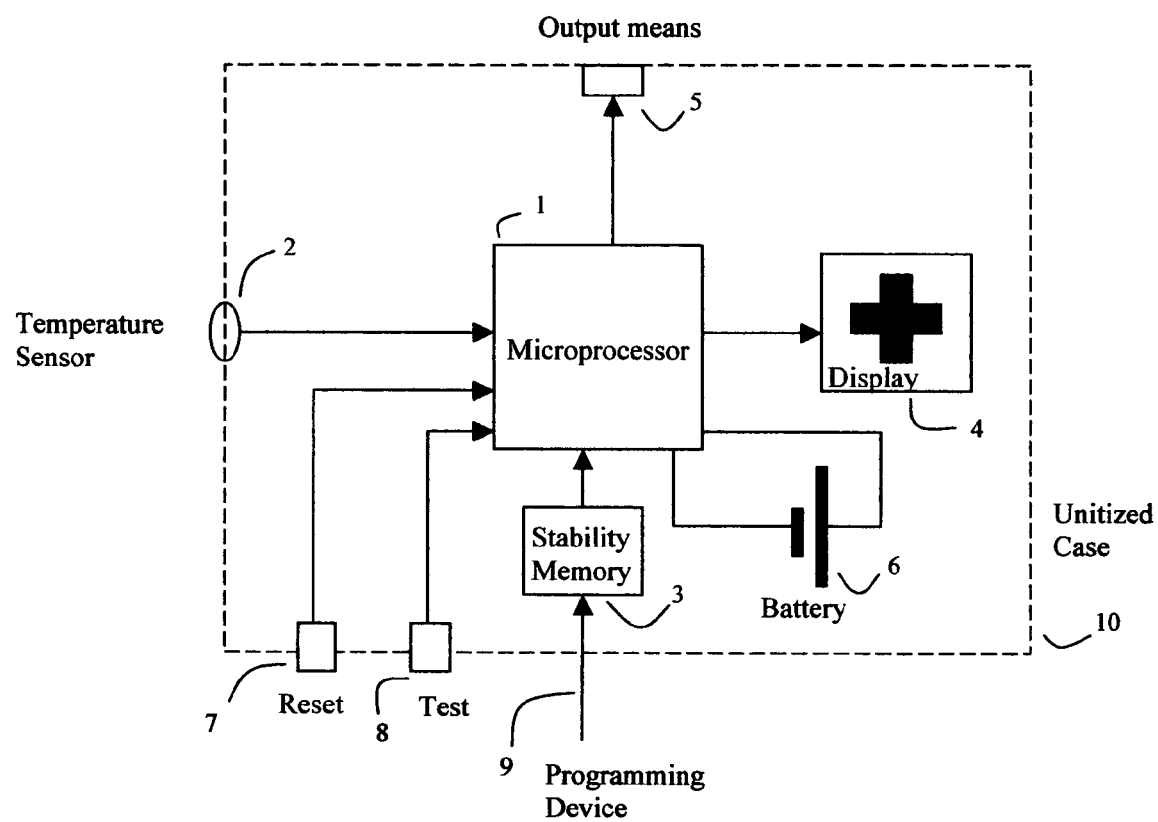
FIG. 2: Schematic diagram of an exemplary electronic circuit

A schematic showing the electrical details of one embodiment of the present invention is shown in FIG. 2.

FIG. 2 shows a microprocessor or microcontroller (1) receiving thermal input data from a temperature sensor, such as a thermocouple or thermistor (2). The microprocessor (1) further receives algorithms from stability memory (3) containing instructions for converting the thermal data into numeric data proportional to the stability impact of the measured temperature upon the monitored material. Microprocessor (1) will typically contain an onboard timer, as well as other general programming information in its own onboard memory.

Microprocessor (1) will have at least one output means. Often this output means will be a visual output means, such as a liquid crystal display (LCD) (4). Other output means, such as light emitting diodes (LEDs), sonic alarms, vibration, radio frequency signals, electrical signals, and infrared signals may also be used. This output means, here exemplified by a liquid crystal display, will at a minimum be able to convey to the user the information that the stability characteristics of the unit have been determined to be acceptable (here designated by a "+" symbol), or non-acceptable (here designated by a "−" symbol). Often, the output means may be additionally used to convey semi-numeric or numeric data as well, such as percent lifetime remaining, device identification numbers, device security numbers, temperature logging data and statistics, as well as supplemental data fields to facilitate data storage and transfer, such as internet universal resource locator (URL) addresses, and the like. In one favored embodiment, the device has an optional infrared light emitting diode or transceiver (5), which can be used to transmit such numeric data using standard RS232 or IrDA protocols. In an alternate embodiment, such as an RFID tag, no display (1) may be present, and (5) may be an RFID tag transceiver.

Although other power sources are possible, microprocessor (1), and other power consuming circuitry in the unit, will typically be powered by battery (6). An example of such a battery is a 1.5 Volt or 3 Volt coin cell.

The microprocessor may optionally have user input means, such as a reset button (7) that zeros and reinitializes the unit. The microprocessor may also optionally have a second user input means, such as a test button (8), that sets the microprocessor to run in an accelerated time mode (faster than real-time) to facilitate quality control testing for the unit, or alternatively instructs the unit to transmit optional statistical data through output means (5).

In order to make the time-temperature unit as versatile as possible, the processor memory containing the material stability data (3) is preferably designed to be a rewriteable memory, such as an electrically erasable programmed read only memory (EEPROM), or flash memory. This EEPROM or flash memory may be reprogrammed by signals from a programming device external to the unit (9). Alternatively, the stability data may be on a replaceable chip (such as a memory card chip), or other memory storage device, which is plugged into the unit.

It is generally convenient to place all the circuitry, including the battery, processor, thermistor (temperature sensor), buttons, and display into a unitized case (10), so as to present a single device or unit to the user. This device may optionally have attachment means, such as adhesive, Velcro, hooks, snaps, etc., to enable the device to be attached to those materials where a thermal history assessment is desired.

In an alternate configuration, where more precise monitoring of outside temperature is desired, the thermocouple or temperature sensor (2) may be embedded into the case wall, or mounted outside of the case. These later configurations may be preferred for situations where the monitor will be stuck directly onto the material to be monitored. In a fourth configuration, temperature sensor (2) may be mounted in the hole or junction between the case and the outside world, and be directly exposed to the outside world, gaining some physical protection while minimizing thermal interference from the case wall itself.

As previously discussed, to allow this device to be rapidly customized for a particular stability monitoring application, it is advantageous that the stability lookup table or conversion function data be stored in a non-volatile read-write storage medium, such as Electrically Erasable Programmable Memory (EEPROM), flash memory, or equivalent. However if this convenience is not desired, a non-reusable memory, such as a programmed read only memory (PROM), or read only memory (ROM) may also be used.

In some embodiments, the stability data stored in (3) may be in the form of a lookup table. In alternate embodiments, the data may not be stored in the form of a lookup table, but rather in the form of one or more mathematical functions that automatically generate the equivalent information.

Microprocessors suitable for the present invention are typically ultra low power microprocessors, with a corresponding long battery life. These microprocessors may additionally incorporate a number of onboard functions such as timers, liquid crystal display drivers, analog to digital converters, and circuitry to drive temperature sensors. The MSP430 family of microprocessors, such as the MSP430F412, produced by Texas Instruments, Inc., exemplifies one such microprocessor type. This processor family includes members with onboard reprogrammable flash memory, as well as analog to digital ("A/D") converters, timers, LCD drivers, reference current sources to power sensors, and other functions. Here, the stability data may be directly downloaded into the flash memory on the same chip that holds the other processor components.

Other processor families are also suitable. It is not necessary that the processor chosen be low current, nor is it necessary that the processor have integrated peripherals (LCD driver, timers, reference current sources, etc.). However such characteristics are desirable as they reduce the complexity and expense of the monitor. Alternatively state machines or other electronic circuitry that can perform the appropriate calculations may be used.

Time-Temperature Monitoring Algorithm:

One of the key aspects of the time-temperature monitor disclosed herein is the software algorithm. Unlike previous temperature loggers, which simply accumulate a record of time and temperature data, and store this record in memory without any attempt to interpret the data, the time-temperature monitor of the present invention continually interprets the data and makes "fitness for use" judgments based upon it. Unlike previous temperature alarm algorithms, such as those taught by USRE 36,200; the time-temperature monitor of the present algorithm continually monitors the impact of stability degradation occurring at all temperature levels (i.e. all temperatures within the measuring range of the instrument), rather than simply monitoring the stability impact of a few preset temperature levels.

The present invention employs a "stability bank" concept for tracking stability, which is illustrated in FIG. 3.

Here, a material's stability is tracked by the status of a stability bank account (B), shown in (1). This account is opened (for fresh material) with an initial deposit of "F" stability points. At regular time intervals, "P" stability points are withdrawn from the account. The number of stability points "P" that is withdrawn for each unit of time is a variable that is a function of both temperature, and the length of the time between successive measurements "$\Delta$ time". This function, designated P(temp, $\Delta$ time), will normally return values throughout the entire temperature measuring range of the instrument, or at least as much of the temperature measuring range as relevant to adequately monitor the thermal stability of the material in question.

Because the $\Delta$ time value is typically constant for any given time periodicity, for the purposes of this discussion, the stability function P(temp, $\Delta$ time) will be abbreviated as simply P(temp).

P(temp) can be any function that adequately monitors the material in question. Since materials usually deteriorate more rapidly at lower temperatures than higher temperatures, P(temp) will often be a function that has a lower value at lower temperatures, and a higher value at higher temperatures. Some materials, however, such as materials susceptible to damage by freezing, have alternate stability profiles in which lower temperatures cause more deterioration than higher temperatures. In this situation, P(temp) may be a function that is higher at lower temperatures. Still other materials may be damaged at both low and high temperatures, and exhibit a "U" shaped P(temp) curve, or more complex curve. For simplicity, FIG. 3 shows the most common case where P(temp) is low at low temperatures, and high at high temperatures.

In this example, at low temperatures (2), a small number of stability points "P" are withdrawn from the bank every unit of time, $\Delta$ time (4). At higher temperatures (3), a larger number of stability points "P" are withdrawn from the bank every unit of time, $\Delta$ time (5).

As the material ages, the amount of stability points remaining in the stability bank (B) decreases. When the stability bank account "B" hits zero, the material has expired.

Mathematically, if the stability bank account "B" of the fresh material is "F", and P(temp) stability points are withdrawn continually, then the status of the stability bank account "B" at any time point is the integral of P(temp) over time, or:

$$B = F - \int_0^{time} P(temp)\,dt \qquad \text{(Equation 2)}$$

In practice, the P(temp) value is usually produced by a microprocessor or other electronic circuit algorithm that relies upon digital measurements from a temperature sensor. As a result, P(temp) usually is a step function with some granularity, such that P(temp) may produce the same results for each degree or tenth of degree of temperature. That is, for example, P(25° C.) is not equal to P(26° C.), but P(25.02° C.) is equal to P(25.03)° C.

Also, in practice, the successive temperature measurements are not taken infinitely close together in time, but also have some time granularity. Typically, P(temp) determinations are taken at periodic time intervals, with a typical frequency of between 1-60 minutes depending upon the application and power consumption considerations. As a result, the integral of P(temp) over time is numerically approximated by a summation function, where each element of the summation function represents the P(temp) from a different sequential time point.

Thus, for example, if time readings are taken every minute, the status of the stability bank account "B" at "Time" (or "T") minutes later is:

$$B = F - \sum_{0}^{Time} P(temp) \quad \text{(Equation 3)}$$

The value of "F" is chosen from experimental or theoretical studies of the material of interest so as to generate a B>0 value when the material is still good, and a B<=0 value when the material has expired, or otherwise reached an important change in state that should be communicated to the user.

Using the stability bank model, and an appropriate selection of "F" and P(temp) values, the stability characteristics of nearly any material can be accurately modeled.

As FIG. 3 shows, as time progresses, and multiple stability unit withdrawals are made, the stability bank becomes depleted. In this example, where P(temp) is lower at low temperatures (10), since the rate of withdrawal is less (11), (12), the bank will retain a positive number of stability units for a longer time. However at higher temperatures (13), where the rate of withdrawal is higher (14), (15), the bank is depleted sooner.

As previously discussed, the stability of many different types of materials can be accurately modeled by careful selection of the P(temp) function or lookup table. For example, enzymes or other materials that are damaged by both low (freezing) and high temperatures may best be modeled by a "U" shaped P(temp) function that generates a high number of stability units at both low and high temperatures, but a relatively low number of stability units at intermediate temperatures.

To obtain accurate results for most materials, the P(temp) function or lookup table should operate throughout the relevant temperature measuring range of the unit, and have a temperature granularity (ability to discriminate and generate different values for) of at least 10° C. or smaller, and preferably 1° C. or smaller. The time granularity, Δ time, of the successive P(temp) measurements should be at least 1 hour or less, and should preferably be on the order of minutes or seconds.

Phase-Transition Effects:

Some materials lose a predictable amount of lifetime every time the material undergoes a phase transition, such as a freeze-thaw event, but are not completely destroyed by the phase transition event. Here, this phase transition represents a second degradation reaction on top of the normal (constant phase state) thermal degradation curve. In this case, second order corrections to equation 2 may be required.

$$B = F - \sum_{0}^{Time} P(temp) - \quad \text{(Equation 3a)}$$
$$c(temp_{time-1,phase-1} - temp_{time,phase-2})$$

Here, in addition to the thermal degradation stability bank model shown in equation 3, the stability bank also undergoes a second withdrawal of "c" stability points every time the material's temperature transitions from the temperature of a first phase state of the material to the temperature of a second phase state of the material.

For example, for a material damaged by freeze thawing, where the material phase transition is the melting point of ice, "$temp_{phase-1}$" might be a temperature under 0° C., and "$temp_{phase-2}$" might be a temperature above 0° C. Here, the algorithm would examine the temperature of the previous time point, as well as the temperature of the present time point, determine if the two temperatures straddle a material phase state boundary, and if so deduct an additional "c" points from the stability bank.

Figure 4:
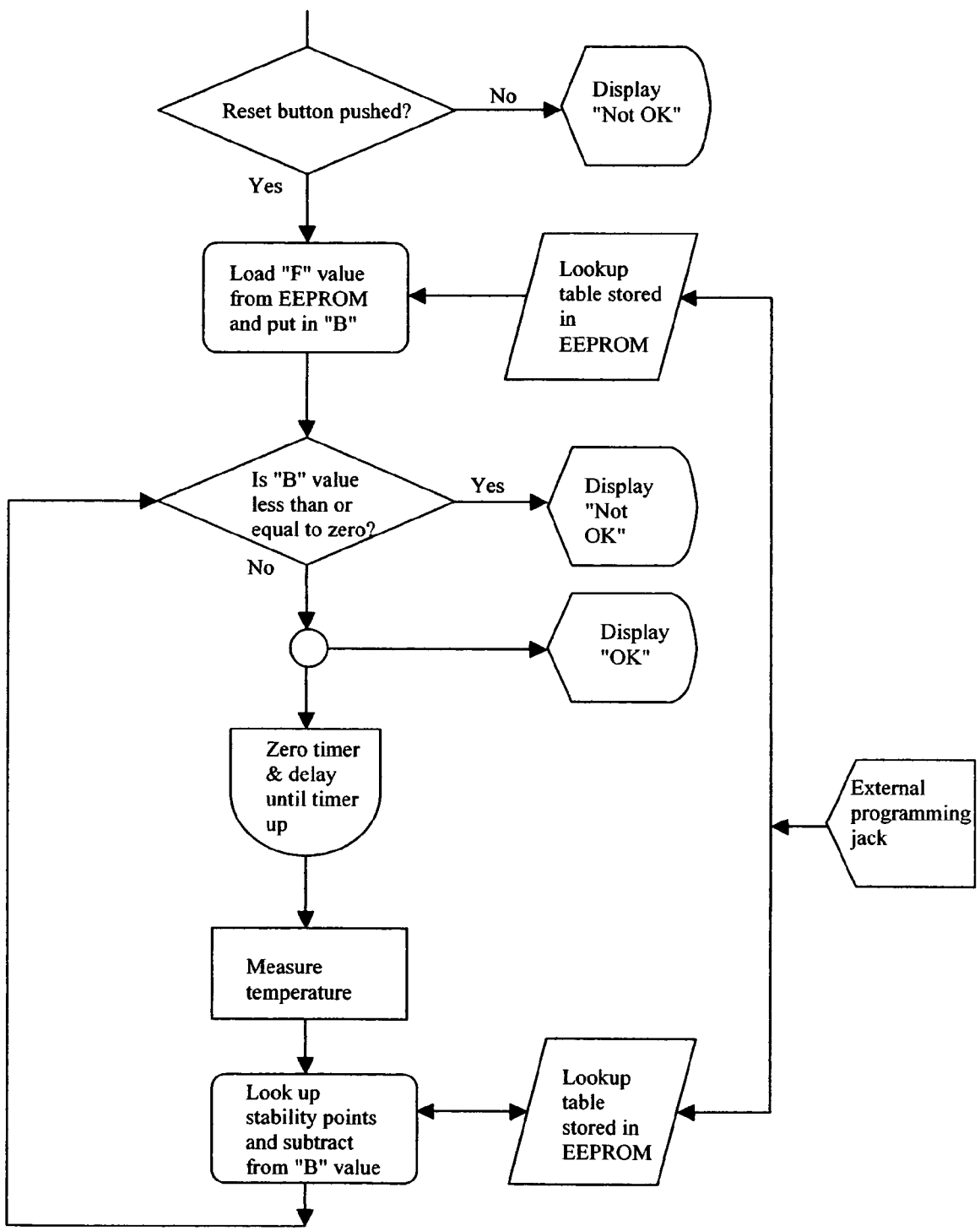
FIG. 4: Flow chart showing a detail of the device's software.

FIG. 4 shows a detail of the software algorithms of the present invention, which implement the stability bank model shown in FIG. 3.

In this example, the device has a reset button that resets the thermal history of the device to a "fresh" state upon initial power up. As a safety precaution, however, upon initial power up, the device initially displays "Not OK" until the reset button has been depressed. This helps protect against accidental losses of power.

Upon initialization, the device retrieves the full stability index number corresponding to fresh material, "F" from its stability data memory, and loads it into the running thermal history bank account "B" register. In this example, the stability initialization memory is of a reprogrammable type, such as EEPROM or flash memory. To enable the device to be rapidly configured to handle a variety of different material stability and thermal history types, this reprogrammable memory may be reprogrammed through a data input jack, which is normally accessible on the device's external surface. Alternatively, the device may be reprogrammed by radio frequency signals, infrared signals, or other modality.

In this embodiment, the device then enters an infinite loop, which can only be terminated by pressing the reset switch. Normally, upon initialization, a positive fresh "F" value will have been stored in the "B" register, and the device will indicate an "OK" message. In this infinite loop, the device continually checks the status of the running total thermal history in the "B" register, and updates it's display to show "Not OK" in the event that the value in the "B" register falls to zero or below zero.

In the next step in the infinite loop, the device will then activate an internal timer, and wait a fixed amount of time. The exact delay will depend upon the material characteristics desired to be modeled. For most applications, the timer will be set to delay for around 1-60 minutes, however this time may vary considerably depending upon the specific application. It may vary from hours on the high end, to minutes, seconds, or even fractions of seconds on the low end.

After the delay time is up, the device will then measure the ambient temperature by querying its temperature sensor, and calculating the ambient temperature. The device will then consult a P(temp) lookup table, or conversion algorithm, to determine how much material degradation ("stability point loss") would be caused by exposure to the measured temperature during the loop-delay-timer time interval. As before, this lookup table or conversion algorithm is preferably stored in a rewriteable memory, such as EEPROM or flash memory, that can be easily be reprogrammed in order to enable the device to be rapidly configured to monitor a large number of different products.

This thermal degradation or "stability debt" number is then subtracted from the "thermal savings account" stored in the "B" register. The device then repeats the infinite loop.

In the event that the thermal savings account stored in the "B" register falls below zero, then the device will immediately detect this during the "B" register value check at the beginning of the infinite loop, and will display "Not OK". Alternatively, if the device is intended to monitor an incubation or curing process, the prompts may be reversed, and the device will display a "Not OK" message until a minimal thermal history has accumulated, at which point it will then display an "OK" message.

Elaborations on this basic scheme are also possible, and often desirable. For example, while the material is still "good", it may be desirable to generate the ratio between the remaining stability number "B", and the original fresh stability number "F", and show the "B/F" ratio on a bar graph or other percentage life remaining display, or use this ratio to store logger values (discussed in example 6). This way, users can see the continual degradation of stability, and will have some warning in advance that the material is about to go bad. Alternatively, users may view the progression of incubation, ripening, or curing process.

In other situations, users may come across apparently prematurely expired units, and be curious as to what triggered the premature expiration. To help address these issues, the unit may also be programmed to display a "potential cause of expiration message". One simple way to do this is, upon stability expiration, to have the unit display a "high temperature" symbol if the temperature at the time of stability expiration was unusually high, and/or to display a "low temperature" symbol if the temperature at the time of stability expiration was unusually low. This way, for example, if a shipment of material arrives in an expired state with a "high temperature" symbol displayed, then the possibility of high transit or storage temperatures would be suggested.

More elaborate "cause of expiration" communication schemes are also possible. In one embodiment, the device additionally contains an onboard temperature data logger that records at least the most recent portion of the unit's thermal history. For example, the temperature logger may consist of a hundred-element data storage memory that records the last 100 hours of temperature measurements, on a one per hour basis. This memory is continually erased and rewritten, in a manner similar to an airplane "black box" data recorder, so that old data is continually being rewritten by new data In this scheme, the product expiration trigger is used to stop the recorder, in much the same way that an airplane "black box" data recorder stops in the event of a crash. (Unlike an airplane "black box" data recorder, however, the monitor remains continually powered, and thus can keep supplemental counters running that can record other useful data, such as the number of hours since the crash occurred, as well as the average temperature and average deviation in temperature since the expiration.) In this scheme, as in the case of an airplane "black box", the most recent data prior to a premature failure is likely to contain the data that is most useful to determining the cause of the premature failure. This scheme is particularly useful in this context, because unlike a typical temperature logger, which will log large amounts of extraneous information, only the most useful portion of the data is presented to the user. This greatly simplifies data analysis. Here, because the user knows that only the most relevant data preceding expiration is being presented, the temperature data stored in the data logger does not necessarily have to be time stamped, which saves memory, and enables the use of lower cost electronic devices.

Alternatively, a large capacity data logger that continually monitors temperature may be used, wherein the product expiration trigger is used to mark an index in the recorder that separates the pre-expiration data from the post-expiration data. In this way, upon playback of all data logger temperature data, the most relevant portions of the data can be immediately determined.

As yet another alternative, the fractional lifetime data can be used to efficiently compact or abstract the relevant temperature logger data into a very small amount of memory. This is discussed in more detail in example six.

Programmability: It should be evident that the particular advantages of the present invention, that of more accurately and realistically simulating the stability characteristics of a given material of interest, usually will require significantly more data than the limited number of fixed time—fixed temperature alarm devices of prior art. In order to maximize the benefits to the manufacturer and user, in a preferred embodiment of the present invention, the finished device is programmable or reprogramable, enabling complex P(temp) functions or relatively large P(temp) lookup tables to be downloaded into the unit.

In a preferred embodiment, the present invention will contain means to enable automated programming and reprogramming of the device, as well as means, such as checksum verification, etc., to ensure that the P(temp) data has been properly entered. Such means include replaceable memory chips, electronic data transfer, infrared data transfer, and radio-frequency data transfer.

Time delays: Often, it may be desirable to incorporate a software time-delay into the unit so that factory workers may initialize the unit, pack the unit with the material of interest, and transport the finished package to a transportation dock, without concern that the electronic time-temperature unit is operating prematurely. To accomplish this, the device software may be configured to enter into a simple time-delay loop between unit initialization, and commencement of stability monitoring activity.

Security: Once a time-temperature indicator has been initialized, it is often important to incorporate security measures in it so as to prevent, discourage, or discover subsequent tampering with the unit. Here, software security methods may be employed that allow factory workers a limited amount of time to reset the unit in the factory, but then prevent users from resetting the unit to a "fresh state" in the field by intercepting any reset command or transient power failure, and locking out subsequent changes to the unit's status. Alternatively, hardware security measures, such as tamper evident security stickers that block access to reset buttons, etc., may also be used. In an alternative and preferred option, the device may generate a random number every time that the device is reset. This random number may be generated by, for example, using the least significant bits from a succession of temperature measurements. This random number can then be output by the device and saved by the user. If, at some later time, the status of this random number changes, then the user knows that the device has been reset.

Unitized Device Configuration:

Typically, the unitized electronic time-temperature indicator device of the present invention will operate as a stand-alone unit, often placed in a shipment container, or affixed to a material of interest, such as an intra venous bag containing a perishable drug, by an adhesive or other type of attachment. In yet another embodiment, the device may be made part of a drug injection pen or infusion pump.

Figure 5:
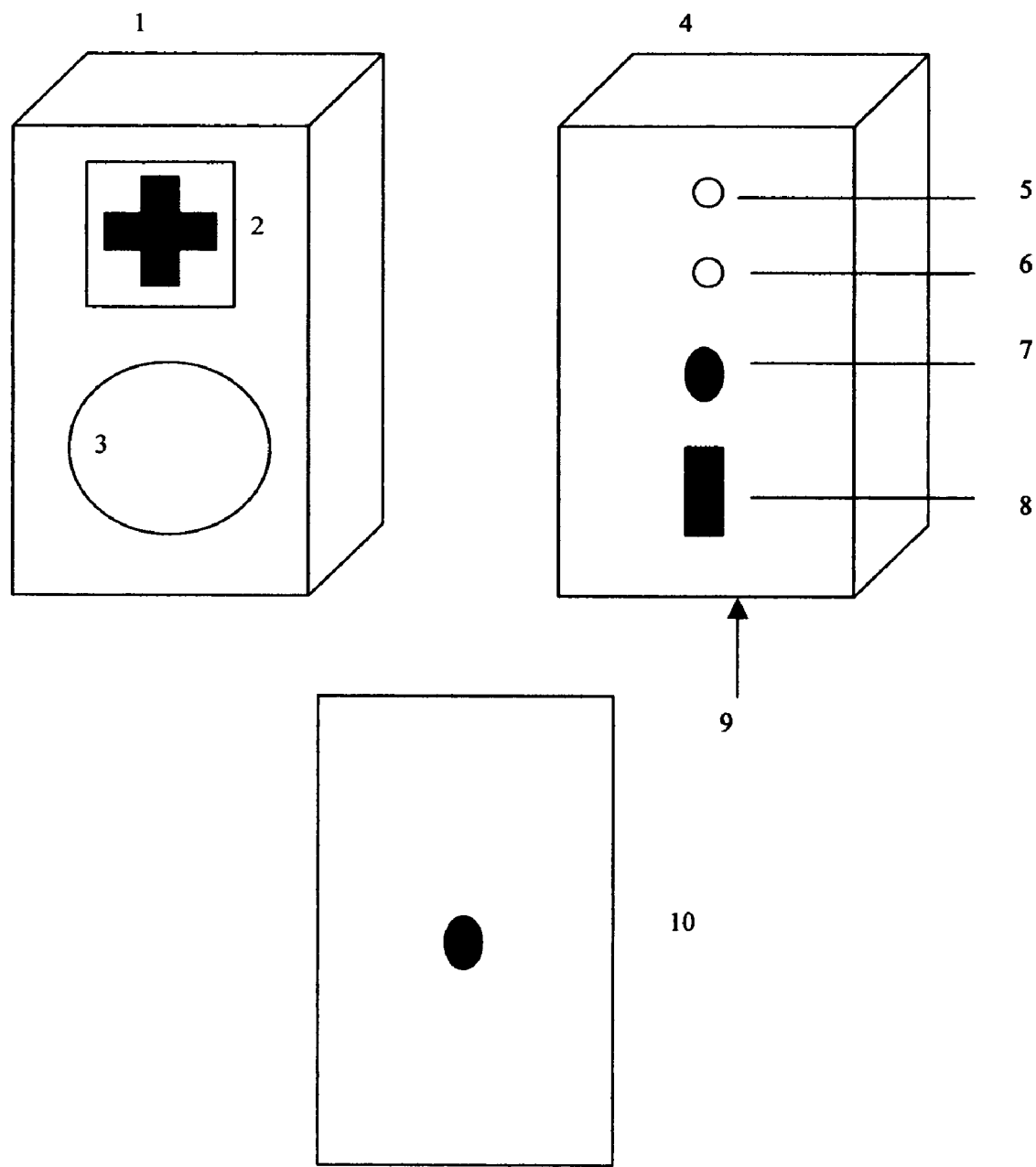
FIG. 5: Sketch of one configuration of the unit.

FIG. 5 shows an example of one such stand-alone configuration. Here, the circuitry is enclosed in case (1) which has a liquid crystal display (2) that displays a "+" symbol if the thermal history of the unit is acceptable (shown), or a "−" if the thermal history is not acceptable (not shown). The unit additionally contains a removable lid (3) that holds a coin cell battery (not shown). The back of the unit, shown in (4) additionally has a "reset" button (5), which can be used to reset the thermal history of the unit back to a "fresh" state. This enables the unit to be properly initialized (thermal history set to zero) upon first use of the unit, and potentially also enable the unit to reused. The unit may also have a "test" button (6), that enables the unit to perform P(temp) determinations at an accelerated speed (typically 60-100×normal the normal rate). This "test" button enables the unit to be rapidly tested for quality assurance purposes.

In this configuration, the unit's temperature sensor is exposed to the outside environment through a sensor mounted on the case surface (7). This exposes the sensor to the outside temperature, while keeping the overall surface of the unit flat. This configuration allows for good temperature equilibration between the sensor and the outside environment, while minimizing the chance of damage to the sensor, and making it easy to use adhesive to press the entire surface of the unit against a flat surface on the material of interest.

The unit's data input jack (8) enables stability data to be programmed into the finished unit. This input jack allows general-purpose units to be easily and rapidly customized for many different products and uses.

The unit may additionally contain a data output means, such as an infrared data transmission port (9), that may transmit additional statistical information to users. This may be triggered by the test button (6) or other button (not shown).

To prevent tampering with the device after initialization, a tough adhesive security seal (10), which may contain a hole in it to for the temperature sensor, may be applied to the back of the unit (4) to discourage users from resetting the device.

In some situations, it may be advantageous to mount the unit's temperature sensor (7) flush to the rear (non display) side of the unit's case, but slightly outside the case. This can be useful for monitoring the temperature of a flexible intravenous (iv) bag containing blood, platelets, chemotherapy, antibiotics, or other perishable material, as well as many other applications. Here, the rear of the case may also contain an adhesive, such that the tag can be affixed to a flexible bag containing a fluid; or other material of interest. In this configuration, the temperature sensor is capable of more accurately monitoring the temperature of the test material.

In other cases, it may be advantageous to mount the sensor on a wire several inches away from the main unit, so that users can see the main unit's display on the surface of a carton, while the temperature sensor monitors the temperature further inside the carton.

FIG. 6 shows a close up of the display (1) of a preferred embodiment of the present invention, incorporating both a large "+", "−" good/not good indicator (2) that can be clearly seen from a distance, as well as a smaller multi-element "lifetime bar" (3). In the fresh configuration, the device will normally resemble (1), showing both a "+" (good) message (2), as well as a full lifetime bar (3).

This lifetime bar (3) may be generated by computing what percentage of the initial fresh stability value "F" now remains in the device. For example, the height of the bar can be displayed to be proportional to the B/F ratio, where B represents the amount of stability units remaining in the device's "stability bank", and F represents the potential number of stability units in the bank when the material is fresh.

As the thermal history of the device progresses, the stability of the material can be tracked as shown on (10). The stability bar (12) will show a decrease in storage lifetime, but while the storage lifetime is still positive, the good/not good indicator (11) will continue to show a "+" (good).

Once the product has reached the end of its stability life (20), the good/not good indicator (21) will typically change to a not-good configuration (21). This display might be used if, for example, the material had reached the end of its shelf life while being exposed to a generally acceptable thermal environment.

In some cases, it may be desirable to also indicate the probable cause of end of stability life. This is shown in (30). Here, the good/not good indicator (31) shows a "−" (not good). Additionally, one of the higher stability bar elements (32) is shown turned on. This might occur if, for example, the device was recording a high temperature at the time that the stability lifetime had reached zero. Alternatively, as is shown in (40), if the device was recording a low temperature at the time that the stability lifetime had reached zero, the good/not good indicator (41) would again show a "−" (not good), and one of the lower stability bar elements (42) would be turned on.

Although stand-alone operation is highly useful, in an alternative embodiment, the device may be incorporated into a second device with an alternative but complementary purpose. In one configuration, a time-temperature monitor operating according to the principles disclosed herein may be incorporated into a pump that pumps perishable liquids, such as an infusion pump. One example would be an insulin pump, intended to be worn for prolonged periods by diabetics. A second example would be an intravenous medication pump.

In still other cases, the device may be designed to operate as a plug-in card or module, so that it may be affixed to a perishable material, such as an IV bag of drugs, for transport from a pharmacy to a patient. Upon arrival at a patient station, such as an IV pump, the time-temperature card may then be plugged into or otherwise interfaced with the IV pump, so that the microprocessor or microcontroller controlling the IV pump may become aware of the thermal history of the drug that it is pumping.

Although it is contemplated that most units of the present invention will have a visual interface, this need not be the only interface that the device is capable of presenting. In an alternate configuration of the invention, the device may also indicate an acceptable or unacceptable thermal history by an alternate communication means. This alternate communication means may be by sound (sonic alarm or signal), electrical signal, infrared signal, radio-frequency signal such as an RFID tag signal, or other communication modality. Examples of radio frequency signals may be 2.4 GHz Bluetooth® wireless signals, 860-960 MHz EPCglobal Gen-2 RFID signals, and the like. In some cases, the device may be hooked up to the Internet, and communicate its status via standard Internet protocols.

Although, in many situations, the unit's sensor will be a temperature sensor, other situations where the time history of a measured value must be determined for acceptability or non-acceptability may also be assessed by the methods disclosed herein. For example, in alternate configurations, the sensor may be a humidity sensor, (and/or ethylene oxide sensor if monitoring of post-harvest agricultural products is desired) and various combinations of temperature, humidity (and/or ethylene oxide) and time may be monitored. In general, any sensor monitoring any type of detectable signal, wherein the signal pertains to an environmental condition that may impact the functional properties of the material, may be used.

Programming the device: After the "F" and P(temp) data have been calculated, the "F" value and table of P(temp) values are downloaded electronically into the device through the unit's data input jack, by radio transmission, or manually through memory chip placement. The programmed device is then ready to use.

Figure 7:
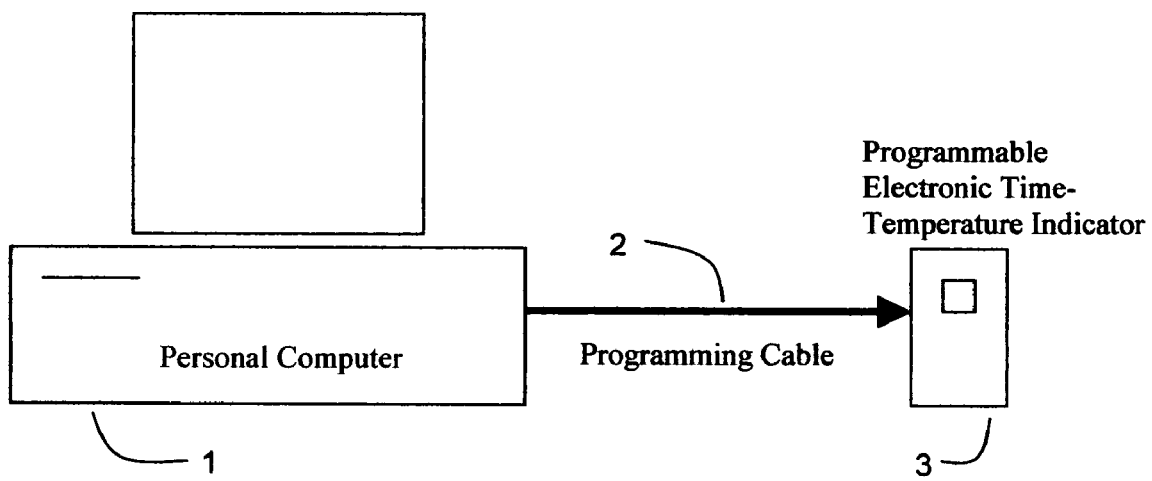
FIG. 7: Sketch showing how the unit may be programmed

To do this, the table of P(temp) values is entered into a data download program, which may run on a personal computer (PC), or other programming system. The device is then connected to the PC's data transfer port via an adapter cable, and the data transferred. After the data is downloaded, the program and microprocessor on the device itself may automatically check the success of the download by comparing the data to a checksum. A schematic of this download process is shown in FIG. 7. Here, a programming device, such as a personal computer (1) transmits data over a programming cable (2) to a programmable electronic time-temperature indicator (3).

Before use, the programmed units will usually be subjected to additional quality control (QC) testing and verification. Here' the unit's ability to operate in an optional high-speed "test" mode, is useful.

To facilitate use in the manufacturing environment, the device can be programmed with a variable "start of testing delay" value between 0 and 1440 minutes (1 day). This allows the manufacturer time to initialize and package the unit before monitoring begins.

EXAMPLE 1

Insulin Time-temperature Monitor

In order to properly configure the device, the stability of the material of interest should first be characterized. To do this, quantitative "maximum acceptable deterioration" criteria, should be established, and used to determine the material's stability lifetime when the material is stored at a variety of different temperatures. The stability lifetime at the various experimental temperature levels is then determined, and used as input into the stability programming calculations.

Using the experimental data, a curve or equation is then generated that fits the observed data. This curve is used to calculate the stability lifetime at intermediate temperatures.

As an example, consider a commonly used injectable drug, insulin. Insulin is commonly carried by traveling diabetics, but will deteriorate if exposed to excessive levels of temperature for too long. The work of Brange et. al. 'Galenics of Insulin' [Novo Research Institute, Denmark] Springer-Verlag, 1987; determined that a particular type of insulin, called "ultralente insulin", has the following stability characteristics:

TABLE 1

Experimental Insulin stability data
Insulin stability at various temperatures (° C.)

| Insulin type | <0° C. | 4° C. | 15° C. | 25° C. | 40° C. |
|---|---|---|---|---|---|
| Ultralente | 0 days | 19 years | 2 years | 4 months | 1 week |

This data is a good example of a material that follows a simple exponential Arrhenius equation through part of the temperature range (e.g. the range greater than 0° C.), but sharply deviates from the simple exponential Arrhenius equation below 0° C. As a result, prior art chemical time-temperature indicators, and other prior-art time-temperature indicators based on exponential Arrhenius methods, are unable to adequately monitor insulin stability throughout the full temperature range (typically −20 to 70° C.) encountered in normal transport and storage conditions. As we shall see shortly, prior art electronic temperature alarms also cannot adequately monitor insulin storage stability throughout these temperature ranges.

Note that at the point of maximum stability (4° C.), the insulin has a fresh lifetime "F" of 19 years, or 165984 hours. Thus, in this example, using hours for the time units to simplify the calculations:

F=number of time units at optimum stability temperature=165984 hours.

So the stability bank "B" for fresh material will have an initial deposit of "F" (165984) units. Moreover, if the insulin is kept at a constant 4° C. temperature, $P(temp_{4C})$ should deduct 1 point per hour from the stability bank "B", and the stability equation (3) is:

$$B = F - \sum_{0}^{Time} P(temp_{4c}) \quad \text{(Equation 4)}$$

thus:

$$B = 165984 - \sum_{0}^{Time} 1$$

or equivalently.

$$B = 165984 - Time$$

To determine the P(temp) values for temperatures above 4° C., the experimental stability lifetime data is modeled by a best-fit equation. The nature of this equation will vary according to the specific material being modeled. In this example, the data from table 1 was converted into an "hours of lifetime" format, and analyzed using a Microsoft Excel spreadsheet program. Excel showed that the 4° C. to 40° C. insulin data fit the following exponential equation quite well:

Stability_lifetime(hours)=$0.77e^{0.1752T}$ where "T" is the time in hours (Equation 5)

To determine the P(temp) values for various temperatures, it is important to note that at a constant temperature, $temp_c$, equation (3) becomes:

$B=F-P(temp_c)T$ (Equation 6)

Now by definition, the stability lifetime is the time "T" when the stability bank "B" first hits zero, so at the stability lifetime limit where B=0, equation (6) becomes:

$0 = F - P(temp_c)T$ (Equation 7)

so solving for $P(temp_c)$, then $$P(temp_c) = \frac{F}{T} \quad \text{(Equation 8)}$$

Thus for any given temperature >0° C., $P(temp_c)$ is equivalent to the lifetime of the material "F" at the optimal stability temperature, divided by the calculated lifetime of the material at the particular given temperature ($temp_c$).

In this insulin stability example; the experimental data from table 1, the maximum stability lifetime "F" of 165984, and the best fit stability lifetime equation (5), can be combined with equation (8) to produce a table of P(temp) values, with a temperature granularity of 1° C., that covers the full temperature range between the lowest and highest experimental data points.

In order to insure the safety of the time-temperature monitor, it is important that both the low and high temperature boundary conditions are properly addressed. In this example, ultralente insulin is known to be damaged by freezing. Thus P(temp) values <=0° C. are assigned a very high point value. This way, the time-temperature monitor will quickly show that the product is unusable upon the detection of freezing conditions. Similarly, at very high temperatures, insulin is inactivated with accelerated kinetics. Since, in this case, the available data do not extend above 40° C., the time-temperature P(temp) values for above 40° C. have also been assigned a very high point value. This way, the time-temperature monitor will rapidly show that the product is unusable upon the detection of temperature values beyond the range of the data available. In practice, it is advisable to collect data over as broad an experimental range as possible, so as to insure the fidelity and robustness of the time-temperature indicator over both expected and unexpected temperature ranges.

These temperature boundary considerations are combined with the experimental data of Brange et. al. to produce a table of P(temp) values, which are shown in table 2 below:

TABLE 2

P(temp) calculations for Insulin stability between −20 to 70° C.

| Temp ° C. | Lifetime Hours | P(temp) | Notes |
| --- | --- | --- | --- |
| −20 | 1 | 165983 | Low boundary |
|  |  |  | Low boundary |
| −1 | 1 | 165982 | Low boundary |
| 0 | 165984 | 165981 | Low boundary |
| 1 | 165984 | 1 |  |
| 2 | 165984 | 1 |  |
| 3 | 165984 | 1 |  |
| 4 | 165984 | 1 | Data point |
| 5 | 82992 | 2 |  |
| 6 | 82992 | 2 |  |
| 13 | 20748 | 8 |  |
| 14 | 18443 | 9 |  |
| 15 | 17472 | 9.5 | Data point |
| 16 | 12768 | 13 |  |
| 17 | 11066 | 15 |  |
| 21 | 5354 | 31 |  |
| 22 | 4611 | 36 |  |
| 23 | 3860 | 43 |  |
| 24 | 3192 | 52 |  |
| 25 | 2912 | 57 | Data point |
| 26 | 2274 | 73 |  |
| 38 | 277 | 600 |  |
| 39 | 232 | 714 |  |
| 40 | 168 | 988 | Data point |
| 41 | 1 | 165981 | High boundary |
|  |  |  | High boundary |
| 70 | 1 | 165983 | High boundary |

To keep the table a manageable size, suitable for printing, the temperature entries between −1 to −20, 6 to 13, 17 to 21, 26 to 38, and 41 to 70° C. are not shown.

Although, in this example, the P(temp) table is calculated assuming a time granularity of 1 hour, for typical application, temperature data and P(temp) calculations will typically be preformed every few minutes.

To illustrate how the methods of the present invention function, and compare with the methods of prior art (such as RE 36,200), consider the insulin monitor of example 1 operating under: a: constant temperature conditions, b: variable temperature conditions, and c: extreme temperature conditions.

For constant temperature conditions "a", assume that the insulin and its associated time-temperature monitor are stored at a constant temperature of 25° C. Then taking a $P(temp_{25c})$ value of "57" from table 2, the stability lifetime would be up when the stability bank value, B, is 0. Thus:

$$B=0=165984-57(\text{lifetime in hours}). \quad \text{(Equation 9)}$$

(lifetime in hours)=165984/57 lifetime in hours=2912 hours lifetime in months=4 months.

This reproduces Brange's experimental data from table 1, which is the correct and expected result.

In the real world, of course, temperatures are not constant. For variable temperature situation "b", consider a monitor that is exposed to a simplified periodic oscillating temperature swing of 12 hours at 25° C., and 12 hours at 17° C. This roughly corresponds to a temperate climate day-night temperature cycle. In this case, what would the lifetime, "L" of the insulin, as calculated by the monitor, be? Here again, using $P(temp_{25c})$ and $P(temp_{17c})$ values from table 2, the time temperature monitor would record:

$$B=0=165984-(57(L/2)+15(L/2)) \quad \text{(Equation 10)}$$

L=165984/36

L=4610 hours

L=6.4 months

Here, the utility of the present invention becomes apparent. It is normal practice to rate the stability of non-refrigerated products as the product's lifetime at a constant 25° C. room temperature. Without the time-temperature monitor of the present invention, the unrefrigerated ultralente insulin would thus be considered "bad" at four months, resulting in a significant amount of waste. Here the improved time-temperature monitor shows that the insulin is still good, and helps to prevent waste.

If the insulin is stored in an insulin pump, other parameters, such as insulin pump motor action, mechanical mixing sensors, etc. can also be modeled and included in the stability calculations.

Note the differences between the techniques of this art, and the techniques of prior art, such as Re. 36,200. Using the methods of prior art, it is essentially impossible to accurately model the extension or loss of product lifetime due to thermal cycling effects. This is because the methods of Re. 36,200 would, at best, teach a first alarm to trigger after a cumulative total of 11,066 hours at 17° C., and a second alarm to trigger after a cumulative total of 2,912 hours at 25° C., but neither alarm would accurately predict the true stability (4610 hours) obtained in the temperature cycling example shown above. Even the use of a third fixed-temperature fixed-time alarm, at an intermediate time point, such as 4611 hours at 22° C., will not work, because in this example, the insulin has not been exposed to temperatures between 17° C. and 25° C. for an appreciable length of time. Thus none of the fixed alarm settings will accurately trigger in this situation. This is shown in more detail in table 3 below:

TABLE 3

Comparison between the methods of this disclosure, and prior art

| Real Time (hours) | Temp. | P(temp) per hour | Present invention: sum of: P(temp)s | Prior art: preset time method, alarm setting |
|---|---|---|---|---|
| 2305 | 17° C. | 15 | 34,575 | 11,066 hours |
| 0 hours | 22° C. | 36 | 0 | 4611 hours |
| 2305 | 25° C. | 57 | 131385 | 2912 hours |
| Cumulative total: | | | 165984 | N/A |
| Reference value: | | | 165984 | N/A |
| Result | | | Correct: Insulin expired | Incorrect (failure of insulin not detected). |

Table 3 shows a detailed comparison between the methods of this disclosure (sum of P(temp) method), and the preset time-temperature settings of prior art, such as RE 36,200. In this example, the insulin data from the case "b" thermal cycling example discussed previously, has been interpreted both by the methods of this disclosure, and by the fixed time—fixed temperature alarm threshold values of prior art. Note that the methods of the present invention are able to accurately function in variable thermal environments, and properly detect that the ultralente insulin has been somewhat degraded by an intermediate level of exposure to a temperature of 17° C.

By contrast, the methods of prior art fail in this situation. Here, the same data are analyzed using three possible fixed time and fixed temperature alarm criterion. Note that in this situation, none of the alarms of prior art will trigger properly. An alarm set to trigger after a fixed time at 17° C. will trigger at 11,066 hours, which is too long. An alarm set to trigger at 4611 hours at 22° C. will never trigger because, in this example, the insulin was never stored at 22° C. An alarm set to trigger at 25° C. will trigger at 2912 hours, which is also too long, because, in this example, the insulin went bad at only 2305 hours. Thus the fixed-time fixed-temperature alarm method is incapable of precisely modeling the storage characteristics of a material with a simple exponential decay curve in a simple thermal cycling situation. When materials with more complex stability profiles are used in more complex thermal environments, the improvement of the present invention over the prior art can become even more significant.

For the extreme temperature situation "c", consider a diabetic traveler who has packed insulin in his suitcase. Unknown to the traveler, the suitcase was stored in baggage truck exposed to the hot sun, and thus encountered temperatures known to rapidly degrade insulin (here assumed to be over 41° C.). Without a time-temperature monitor, the traveler would assume that the insulin was still good, and expose himself to risk by taking degraded material. By contrast, even if the insulin was totally fresh, with a thermal history of only three previous hours of shelf life storage at 4° C., the indicator would record:

$$B=0=165984-165981(L)-1(3)$$ (Equation 11)

L=165981/165981

L=1 hour

Thus, in this example, assuming any meaningful prior thermal history, exposure to extreme temperature conditions over 1 hour will trigger the time-temperature monitor. In the case of zero prior thermal history, then exposure to extreme temperature conditions over two hours will trigger the monitor. By the proper choice of coefficients, essentially any desired triggering sensitivity may be achieved.

As previously disclosed, to make these calculations as simple to show as possible, the time resolution (granularity) of the temperature readings was taken on a one P(temp) determination per hour. For most real-world uses, however, P(temp) should be determined on a more frequent basis (finer granularity), such as one P(temp) reading every minute or every few minutes.

EXAMPLE 2

Other Drug Monitoring Applications

There are a number of medically important antibiotics, such as the β-Lactam antibiotics (which include Ceftazidime, Cefepime, Imipenem, Meropenem, Cefpirome, and others), which would be most effective if the drugs could be administered by continuous infusion to ambulatory patients. Such continuously infused antibiotics would be highly useful for treating cystic fibrosis, immunocompromised chemotherapy patients (who are at risk for sepsis), and many other conditions.

However due to the poor thermal stability of the β-Lactam antibiotics, current continuous infusion pump (either mechanical or elastomeric) technology is inadequate. In the liquid form, many of the β-Lactam drugs deteriorate after only a few hours of exposure to temperatures above 25° C. Since body temperature is 37° C., conventional ambulatory infusion pumps, which usually are worn underneath clothing, typically expose such drugs to unacceptable levels of thermal stress.

These issues are discussed in detail in Viaene et. al., Antimicrobial Agents and Chemotherapy, August 2002, p. 2327-2332; and Baririan, et, al., *Journal of Antimicrobial Chemotherapy* (2003) 51, 651-658.

The time-temperature monitoring technology of the present disclosure is well suited to address these issues. Here, the drug of interest may be incorporated into syringes, elastomeric pump bags, or other container, and incorporated into an ambulatory infusion pump apparatus. This infusion pump apparatus will also contain a time-temperature monitoring unit, programmed to match the thermal stability profile of the drug. This time-temperature unit may be part of the drug storage container, or part of the infusion pump. Using such technology, temperature sensitive drugs may be safely used, and the electronic time-temperature unit will warn the user, and possibly shutdown the pump, if the drug has deteriorated to an unacceptable level.

FIG. 8 shows how the visual output from the device of the present invention may be supplemented by additional statistical data. Here the device is equipped with both an LCD display as shown in FIG. 6, as well as an infrared light emitting diode (previously shown in FIG. 2(5) capable of transmitting data to an external computerized reader equipped with an infrared receiver. The device has been programmed with the parameters for the β-lactam antibiotic Cefepime. Here a user is visually warned that the Cefepime has expired by a "–" display on the device. The user, upon seeing an unexpected display value, can then interrogate the device by downloading supplemental statistical data to discover exactly when and how the Cefepime expired.

FIG. 8 shows the results of the download operation. (1) shows the time of the download; (2) shows the identification codes previously stored in the device; (3) shows the security code that is randomly generated each time the device is reset, as well as the data transmission checksum; (4) shows that the Cefepime thermal history has exceeded the preprogrammed Cefepime parameters; (5) shows the total number of hours that the device has been running; (6) shows the number of hours the device ran before and after the Cefepime expired, as well as the average temperature and temperature deviation before and after expiration; (7) shows the time interval between successive logger measurements, as well as the total amount of time that the temperature logger ran; (8) shows the actual logger values, and the time before data download that the values occurred; (9) shows the time the logger expired, which is computed by the download device using the time of download, and the number of hours before download that the logger expired.

Note that in this example, it can be seen that the Cefepime was removed from refrigeration (0° C. values) and exposed to a very high temperature (40° C. values) for about 8 hours before the Cefepime expired. Since the Cefepime expired at around 4:38 AM on April 7, the Cefepime must have been removed from refrigeration at around 8:38 PM on April 6.

This illustrates one of the key advantages of the present invention. Since the device continually computes if the stability is acceptable, and displays the result, the user does not need to go though the substantial amount of effort to download and interrogate a unit for more information very often. Rather, this only needs to be done in the unusual circumstance that the visual display shows that unexpected thermal stress has occurred. Vaccines and other temperature sensitive medical products may be monitored by similar means.

EXAMPLE 3

Blood-bank Applications

A good example of a more complex time-temperature stability curve can be found in blood storage conditions for blood banking.

At present, the storage conditions for whole blood are:

TABLE 4

Blood bank storage conditions for whole blood

| Temperature | Time |
| --- | --- |
| <0° C. | Instant expiration |
| 1-6° C. | Up to 42 days |
| 10° C. | Up to 24 hours |
| 11° C. | Up to 5 hours |
| 20° C. | Instant expiration |

Although a curve passing through all the data points in table 4 would not fit the Arrhenius equation, the curve can be approximated by a mix of different Arrhenius curves, each operating over a different part of the temperature region, plus a mix of other functions.

Figure 9:
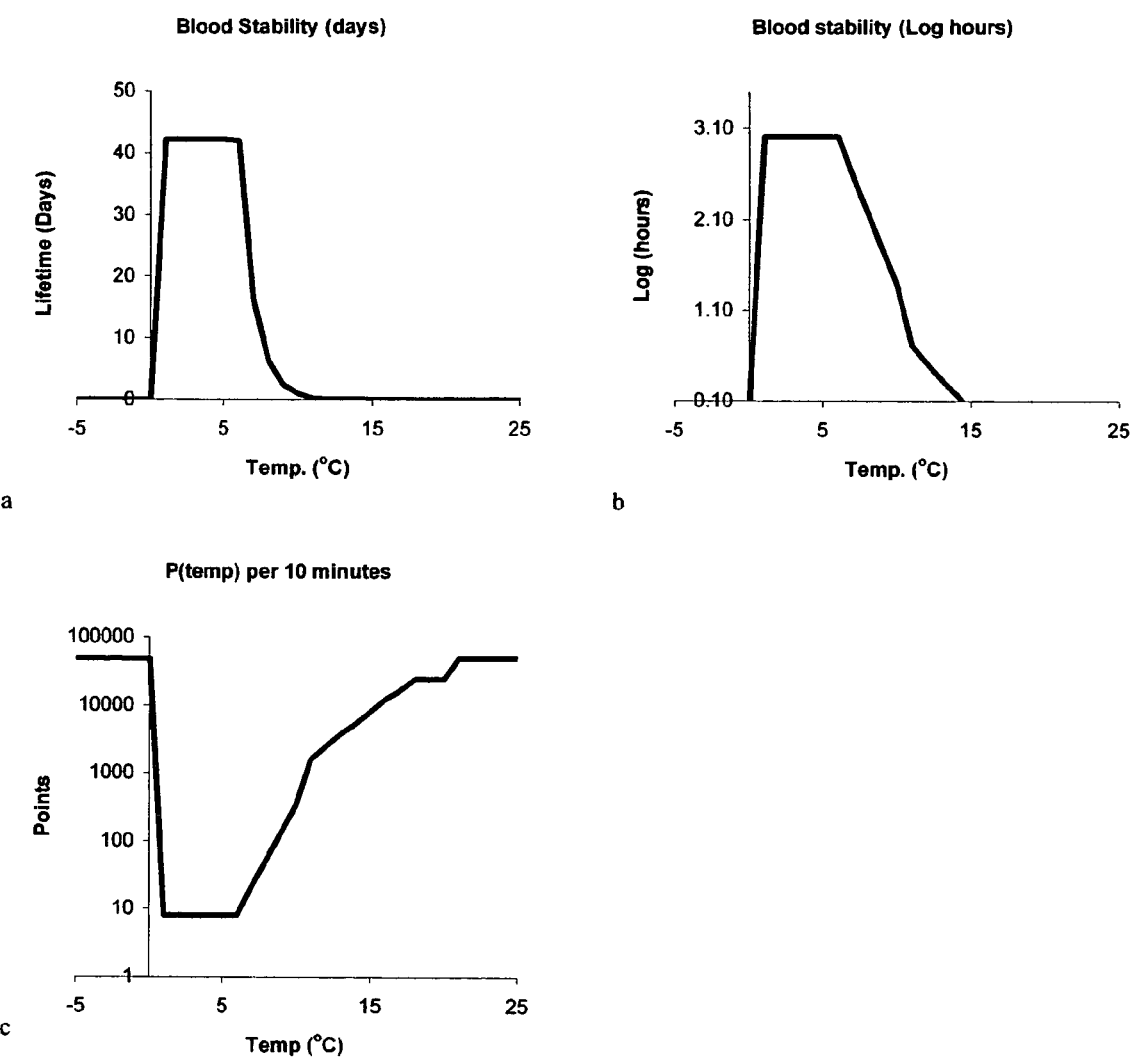
FIG. 9: Graph of the stability curve of whole blood for transfusion, along with a graph of corresponding P(temp) values.

Here, as in example 1, the exponential Arrhenius equation can be used to calculate the values in-between the experimental data points shown above, and this in turn can be used with equations similar to example 1 to generate a table of P(temp) values, and used to program the stability monitor of the present invention. This is shown in FIG. 9. FIG. 9(a) shows blood stability (in days) versus temperature; FIG. 9(b) shows a log plot of the blood stability (in hours) versus temperature. FIG. 9(c) shows a graph of P(temp) values used to program the monitor, assuming that the monitor is programmed to perform the stability bank calculation every 10 minutes, and where the "F" value is initially set to 48,552 stability units.

EXAMPLE 4

Therapeutic Protein Immunogenicity

Therapeutic proteins may denature to an antigenic state upon exposure to thermal stress. The temperature monitoring technology of the present invention may be set to warn when a therapeutic protein drug has had a thermal history associated with increased risk of unwanted immunological activity. The indicator device is designed to remain with the drug as the drug travels throughout different links of the cold chain. In a preferred embodiment, the indicator device remains associated with the therapeutic protein from the time of manufacture up until the final few minutes before the drug is used. In alternate forms of the invention, additional parameters, including motion, light, and turbidity may also be monitored.

EXAMPLE 5

Other Applications

Other applications for the device include monitoring bacterial growth using algorithms from relevant predictive microbiology (useful for hazard analysis and critical control point "HACCP" monitoring of food products). Still other applications include monitoring of post-harvest agricultural products, such as the shelf-life of fruits and vegetables, vase-life of cut flowers, and other plant materials. In this later case, useful stability data can often be obtained by using the plant's oxygen consumption (respiration rate) as a function of temperature as input data for the stability bank calculations. This is because respiration rate is a good indicator of plant metabolic activity as a function of temperature, which in turn correlates well with the effects of temperature on the storage-life of plant materials.

EXAMPLE 6

Compressing logger and material status data to fit into the limited user data fields transmitted by EPCglobal Gen-2 RFID tags, and equivalent designs.

Modern RFID tags are the result of a series of engineering compromises. In many real world use situations, very large numbers of RFID tags (hundreds or thousands) may quickly run through a conveyer belt, past an automated RFID reader device. This RFID reader device must individually interact with, uniquely identify, and extract data from each and every different RFID tag. This must be done with an extremely high level of accuracy. If each tag spends a lot of time sending large amounts of data to the RFID tag reader, the resulting signal clutter will greatly degrade the overall performance of the system. As a result, RFID tag designers have a huge incentive to minimize the overall number of bytes of data transmitted per tag. This is because the smaller amount of transmitted data reduces the amount of unwanted signal packet collisions, which can occur when large numbers of RFID tags are being read simultaneously.

As a result, RFID tags that followed the original EPCglobal Gen-1 RFID tag specifications transmitted only a very small amount data. This data was essentially limited to a 64 or 96-bit Electronic Product Code (EPC). This limited amount of data proved to be overly limiting, however, and EPCglobal subsequently extended the amount of data transmitted per RFID tag in their later (2005) Gen-2 RFID tag specification. The Gen-2 specification keeps the earlier EPC data, but also adds an additional RFID tag user memory that is available for tag manufacturers and users to manipulate. This additional user memory includes up to 256 bits of data, configured as up to 16 (0-F hex) 2-byte-long (16-bit) words of user memory.

Figure 10:
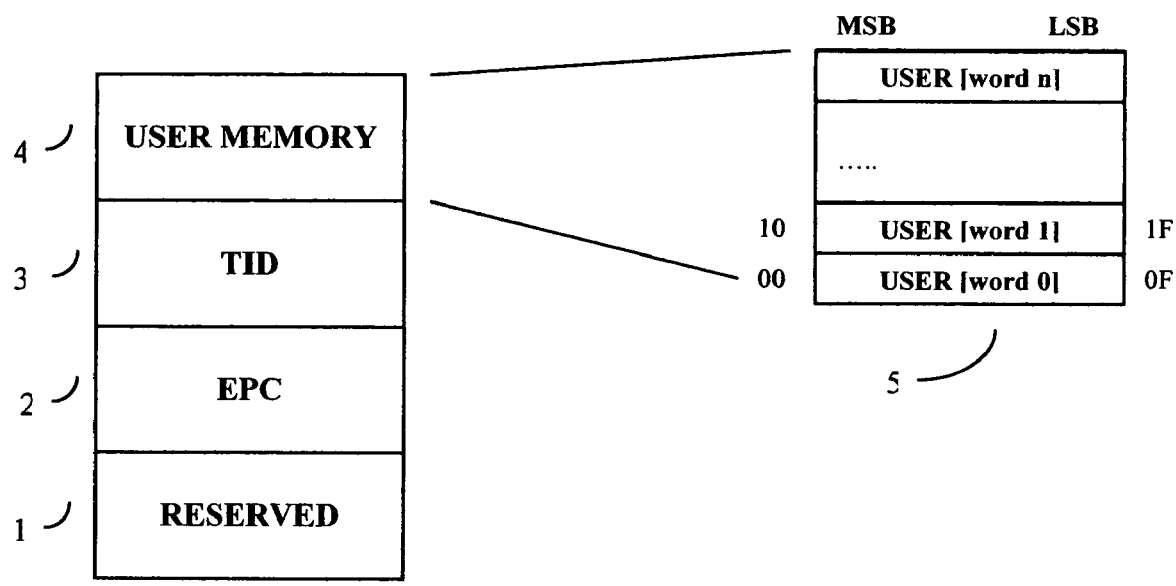
FIG. 10. Diagram showing the various data fields output by EPCglobal Gen-2 RFID tags.

A diagram of the logical memory map of an EPCglobal Gen-2 RFID tag data field is shown in FIG. 10. This figure is a simplification of FIG. 6.17 from: "EPC™ Radio-Frequency Identity Protocols Class-1 Generation-2 UHF RFID Protocol for Communications at 860 MHz-960 MHz, Version 1.0.9"; January 2005, EPCglobal Inc, page 35. As FIG. 10 shows, the Gen-2 tag's Electronic Product Code (EPC), which is the material's unique identifier code, forms only one portion of the RFID tag's memory. This EPC segment is shown in 10(2). The Gen-2 RFID tag specification now allows for additional types of memory, including a reserved portion (1), a Tag Identifier Memory (TID), which is shown in 10(3), and the previously discussed user memory, which is shown in 10(4).

As previously discussed, and as shown in 10(5), this user memory is further divided into a number (0-n) of 16 bit words. These words are further subdivided into a MSB (most significant byte) and a LSB (least significant byte). The bit addressing structure for this user memory is shown in the "00 . . . 1F" annotation surrounding 10(5). This memory is available for additional functions, and can be freely altered without affecting the Electronic Product Code EPC or other portions of the Gen-2 RFID tag data field.

In practice, cost considerations tend to put limits on the amount of RFID tag user memory, even for Generation-2 tags. At present, Impinj corporation, Seattle Wash., is producing a Monaco/64 Generation-2 tag with 64 bits of user memory (in addition to the standard the 96 byte EPC). STMicoelectronics, Geneva Switzerland, is producing a XRAG2 chip with both a 128-bit EPC and 128 bits of additional user memory.

64 to 128-bits are not exactly a large amount of memory with which to store an extended time-temperature history log. A standard temperature logger may generate at least an 8 to 16-bit data point every few minutes to every few hours, potentially creating thousands, tens of thousands, or hundreds of thousands of bytes of data over the storage lifetime of a material. Clearly, in order to fit this massive amount of data into a RFID tag with a user memory between 16 and 256-bits of data, methods must be found to compress and abstract this a very large amount of logger data into a very small amount of RFID tag memory, while still preserving the most important elements of the original temperature logger data.

Fortunately, the remaining lifetime data methods of the present disclosure make it feasible to compress and abstract this large amount of logger data. Although these methods are "lossy" (some temperature logger data is lost), the methods still preserve some of the most important elements of the logger data—namely the history of the key milestones in the particular material's stability lifetime. These milestones show when and how the product ended up losing significant chunks of its storage life.

These methods rely upon the present's disclosure's teaching of methods to continually determine remaining material storage life. Using these methods, an RFID tag that continually computes the percentage lifetime remaining in a particular material can use this information to determine whenever the material has reached important preset remaining lifetime milestones. The tag can then use this information to store only the most significant part of the time-temperature logger data (the time when certain lifetime milestones were reached) in the very limited amount of RFID tag user memory.

By using the tag's computed lifetime data to abstract out just the most important part of the material's time-temperature log, the data records previously described in FIG. 8 can be compressed to fit into the very small RFID user memory fields. An example of how this can be done is shown in Table 5.

TABLE 5

RFID user memory map 1 (64-bit user-memory RFID tag)

| Word | Use | Byte 1 | Byte 2 |
|---|---|---|---|
| 0 | Product status | Remaining life | # Words    Config. |
| 1 | T: Avg & STDEV | Avg. Temperature | STDEV temperature |
| 2 | Hours since start | 16 bit value | |
| 3 | Log 0: expired data | Temperature | Time of expiration |

The first word is used to convey the product lifetime data, and to inform the RFID tag reader device about how many additional words of temperature logger data are available. The "remaining life field" in word 0 can contain a byte (8 bits of data or 256 possible values). Usually it will be convenient to map this first remaining life byte into a +127 to −127 range. This in turn can correspond to the product's remaining shelf life, which can vary from 100% (100) or totally fresh, to 0 (expired), to −100% (degraded beyond twice the material's normal shelf life).

Byte 2 of word 0 can be used to let the automated RFID tag reader know how many additional words of RFID tag user memory are being used to store temperature-logging and shelf-life data. (As previously discussed, Generation 2 RFID tags can store up to 16 words of data in user memory). Thus the first "# Words" nibble (4 bits, corresponding to 16 possible values) of byte 2 of word 0 can be used to indicate how many words of logger data are available. Here a nibble value of 0 (the nibble 0000) would indicate that only the first word (word 0) of the RFID tag memory was being used for temperature-lifetime monitoring purposes. By contrast, a nibble value 15 (the nibble 1111) would indicate that all 16 words of user memory were being used for temperature-lifetime monitoring purposes.

The second "Config" (configuration) nibble (final 4 bits) of byte 2 of word 0 can be used to inform the automated RFID reader device about how the temperature logger fields in the RFID tag were configured. This can include information about the time-scale used for the RFID tag's clock (days, hours, or minutes), and also information about the data structures (number of bytes allocated for temperature data, number of bytes allocated for time data) used in the remainder of the RFID tag's user memory.

Word 1, if available, can be used to convey other useful data such as the average temperature the material experienced before it expired, as well as the standard deviation in this average temperature.

Word 2, if available, can be used to convey other useful data such as the precise amount of time the RFID tag has been running, or alternatively the precise date in which the RFID tag was started. Although examining the material's electronic product code might also retrieve this information, this elapsed time information is not always available if the RFID tag reader device does not have a good access to the material's electronic database. A significant advantage of this disclosure's approach is that by incorporating this information directly into the tag's user data field, this information will be available even to remote users who may not have product database or Internet access. In order for this time data to be very high precision, often this will be stored as a 16-bit number with an hourly time base.

Word 3, if available, can be used as the start of the more detailed temperature logger portion of the RFID tag's user data field. Normally, the most critical time-temperature logger information is the details of exactly when and how the product expired. This information is critical because it can be used for corrective action to prevent future supply chain problems. As a result, word 3 will normally contain a record of the temperature conditions around the time that the product expired (e.g. 0% lifetime remaining, or alternatively 100% lifetime used up), and the approximate time that the product expired. Using this scheme even a very small, 64 bit, user memory RFID tag can output a % lifetime remaining, average temperature and standard deviation in temperature before product expiration, hours elapsed since tag start, and the approximate time and temperature conditions that existed when the product expired.

RFID tags with larger user memories can output additional logger data. As previously discussed, one very useful set of markers is the observed temperature and time when the logger reaches various predetermined percentages of remaining lifetime. Here, these predetermined percentage lifetime markers (e.g. 10% lifetime, 20% lifetime, and so on) are called "milestones". Since in some cases, users may continue to be interested in the materials' status even after it has reached the end of its nominal lifetime (i.e. the user may want to determine suitability for emergency use, risk of generation of toxic byproducts, etc.), these milestones can extend to beyond the material's nominal lifetime.

As an example, by using a 128-bit RFID tag user memory and the following scheme, a fairly detailed temperature history log can be output showing the time and temperature data milestones from the times when the product used up 20%, 40%, 60%, 80% and 100% of its shelf life. Word 3 stores the 100% used up (expired) time and temperature data, and the 20% to 80% lifetime time and temperature data can be stored in Words 4-7. This scheme is shown in Table 8.

To further compress time and temperature data into the various 16-bit RFID word data fields, additional compression is often useful. One way to do this is to subdivide each 16-bit RFID user data word into a 6-bit temperature field and a 10-bit time field. In this example, the 6-bit temperature field can represent $2^6$ or 64 different temperature levels. The 10-bit time field can record up to $2^{10}$ values, which corresponds to logger data for up to 1023 days (assuming that logging is done on a once a day basis), or 511 days (on a twice a day basis) and so on. Alternate schemes, such as bank switching, in which supplemental data bits, used to improve the time or temperature resolution, are stored in a different RFID user memory word, can be used if higher temperature or logger time precision is needed. The existence of such alternate bank switching data schemes can be communicated to the automated RFID tag reader device using the "Config" (e.g. configuration) data field from Word 0.

In commercial applications, temperatures often span a fairly broad range, such as −70 to 70° C. However usually information about the extreme temperature values is less useful, and information from the middle temperature range (for example around 0° C.) is more important. The higher importance of the middle range can be exploited create a 6-bit temperature compression scheme that is adequate for most everyday purposes.

Since many materials are most temperature sensitive near the freezing point, the 64 values possible with the 6-bit temperature field need not be linear—that is it need not simply cover a temperature range from −32 to +32° C. in 1° C. increments. Rather, it may be useful to cover the range near 0° C. with higher precision, and cover extreme temperature ranges (e.g. −70° C., +70° C.) with lower precision. One possible way to cover a −70 to 70° C. temperature range with 6-bits of memory data is as follows:

TABLE 6

Compressing a −70 to 70° C. temperature range into a 6-bit data field

| Temperature range | Logger resolution | 6 bit (0-63) temperature range (decimal values) |
|---|---|---|
| Below −75° C. | | 00 |
| −30 to −70° C. | 10° C. increments | 01 to 05 |
| −15 to −25° C. | 5° C. increments | 06 to 09 |
| −2 to −10° C. | 1° C. increments | 10 to 18 |
| −1.5 to +1.5° C. | 0.5° C. increments | 19 to 25 |
| +2 to +30° C. | 1° C. increments | 26 to 54 |
| +32 to +40° C. | 2° C. increments | 55 to 59 |
| +45 to +70° C. | 5° C. increments | 58 to 63 |
| Over 75° C. | | 63 |

This temperature data can then be packaged into a 16-bit RFID user memory word (or "data field") according to the following data structure:

TABLE 7

Compressing time and temperature data into one, 16-bit RFID, word

| Temperature field (Hex A-F) | Time field (Hex 0-9) |
|---|---|
| Temperature value at milestone x of the material's storage lifetime | Elapsed time between initial RFID initialization, and reaching milestone x of the material's storage lifetime. |

Using this scheme, the resolution of the temperature logger can be easily adjusted upward or downward to fit available RFID tag user memory. Less expensive RFID tags, or tags where the user memory needs to be allocated to additional functions, can choose to implement fewer temperature logging points or "data points". More expensive RFID tags, or tags where larger amounts of user memory are free for temperature logging purposes, can choose to implement more temperature logging points or "data points".

The following scheme shows a scalable data structure that can fit differing RFID tag user memory from 16 to 256 bits (or even higher if the range of the "# Words" field is increased to allow for more than 16 2-byte words ("data points")). Table 8 shows an example for an RFID tag with a 128-bit user data memory:

TABLE 8

RFID user memory map 2 (RFID tag with a 128-bit user memory)

| Word | Use | MSB: Byte 1 | LSB: Byte 2 |
|---|---|---|---|
| 0 | Product status | % Remaining life | # Words   Config. |
| 1 | T: Avg & STDEV | Avg. Temperature | STDEV temperature |
| 2 | Hours since start | 16 bit value | |
| 3 | Log 0: expired data | Temperature | Time of 100% expiration |
| 4 | Log 1: 20% expired | Temperature | Time reached 20% expired |
| 5 | Log 2: 40% expired | Temperature | Time reached 40% expired |
| 6 | Log 3: 60% expired | Temperature | Time reached 60% expired |
| 7 | Log 4: 80% expired | Temperature | Time reached 80% expired |

Thus for RFID tags with 128-bits of user memory, the user would have all the previous data from the 64-bit tag example from Table 5, and additionally the user would also be able to retrieve a fairly detailed log showing quite precisely (usually within a degree or so, and within a few hours) exactly when the product had used up 20%, 40%, 60%, 80% and 100% of its rated shelf life. This data would reproduce most of the key information from standard data logs, as well as the temperature data log shown in FIG. 8.

The ability to determine exactly where in the supply chain unwanted levels of product deterioration occur would bring an entirely new level of precision to supply chain management. At present, materials arrive, appear on initial inspection to be adequate, and are received into stock, only to unexpectedly deteriorate a short time later. With the RFID logger methods of the present disclosure, supply chain issues can be easily detected. For example, consider a material that arrives in an unexpired state, but with 80% of its lifetime used up. If the RFID tag for the material (here assumed to have a nominal 3 year shelf-life) shows that the material passed its 20% lifetime marker 21 days ago, and then passed its 40%, 60%, and 80% lifetime markers a day latter, it is a safe conclusion that something bad happened to the material between day 20 and day 21.

This information allows the material, which in this example has not yet expired, to be efficiently used—that is, the material handler can choose to use this material earlier rather than later. This instant information would also allow many different types of supply chain issues to be quickly identified and corrected, and help minimize waste.

Still other words of RFID tag user memory can be reserved for other parameters. For example, in the case where the RFID tag contains a humidity or ethylene oxide sensor, and is used to monitor ripening fruit, other user memory data fields can be used to record humidity or ethylene oxide levels at the time when the fruit had reached certain ripeness milestones. Environmental sensor data, such as humidity, shock, vibration, light, etc. can also be monitored and stored in this manner.

Note that the data compression and abstraction methods taught in example 6 are general purpose. That is, the general concept of comparing fractional remaining storage life with selected lifetime milestone values, and using the results of this comparison to determine what type of time or environmental sensor data is stored in a device's memory, do not depend on any particular way of determining fractional remaining storage lifetime. As a result, these data compression and abstraction methods would also function with alternative methods of determining a material's remaining lifetime, such as the chemical methods used in prior generation Time-Temperature Indicators, discussed previously.

In an alternative embodiment of the present disclosure, a chemical time-temperature indicator material may be incorporated into an electronic circuit (such as an RFID tag, producing a device similar to the Bioett RFID tag previously disclosed by Sjoholm et. al. in WIPO application WO0125472A1.

Here, however, the teaching of Sjoholm may be extended, and a more sophisticated chemically based RFID tag time-temperature monitor may be produced. This tag can be a passive RFID tag, which derives its energy from the radio frequency signal produced by an RFID reader, a battery assisted passive RFID tag, or alternatively a powered RFID tag. Here, a passive (unpowered) RFID tag is used as an example.

In this example, the RFID tag electronics are configured so that the tag is powered by an RFID tag reader device. This RFID tag reader device also communicates the present time to the RFID tag. This chemical RFID tag can use the power from the RFID signal to read the status of the chemical indicator, and compare the factional remaining storage lifetime of the material (obtained from the chemical indicator) with one or more material lifetime milestones previously stored in the electronic portion of the RFID tag. Depending upon the results of the comparison, the passive RFID tag can then store the time that the material passed a particular milestone in the passive RFID tag's user memory. If there is enough energy available, the passive RFID tag could additionally read an environmental sensor and also store the results of this sensor reading in user memory as well.

Assuming that the tag is read a number of times throughout its storage life, the tag will then preserve a rough record of the various times at which the material passed through various stability (storage lifetime) milestones. Although this passive chemical RFID tag would not be expected to be as easy to customize as a powered electronic RFID tag, and although the record generated by this passive chemical RFID tag would also be more dependent upon how often the tag was scanned during its storage life, the passive chemical RFID tag could potentially be cheaper to produce. This would allow this type of technology to be used for lower value items such as post harvest agricultural products, common industrial chemicals, and the like.

The invention claimed is:

1. A unitized electronic time-temperature indicator device for rapidly assessing the acceptability of a material's thermal history;
   said device having time monitoring means, calculation means, memory means, and sensors at least capable of monitoring temperature;
   said device having means for continually calculating the material's remaining storage life;
   said device additionally containing one or more preset fractional lifetime milestone values;
   wherein said device compares said material's remaining storage life with said fractional lifetime milestone values and determines when one or more of said milestone values have been reached;
   wherein said device uses the result of said comparisons to determine if information derived from the output of said device's time monitoring means or said devices' temperature monitoring means should be stored in said device's memory means.

2. The device of claim 1, in said device stores milestone data in said device's memory; said milestone data consisting of one or more of milestone time data, or device sensor data obtained around the time that the particular milestone was reached.

3. The device of claim 1, in which said device stores temperature or other sensor logger data in said device's memory means.

4. The device of claim 1, in which said device outputs a fitness for use output signal on reaching the fractional lifetime milestone value, said fitness for use output signal being chosen from the group of visual output signals, vibration signals, sonic signals, radiofrequency signals, electrical signals, or infra-red signals.

5. The device of claim 1, in which said device contains additional sensors selected from the group consisting of humidity sensors, ethylene oxide sensors, or sensor for other environmental condition that impacts the fitness for use lifetime of said material, and said device uses said comparisons between said material's remaining storage life and said fractional lifetime milestone values to additionally store data derived from said additional sensors into said device memory means.

6. The device of claim 1, in which the materials are selected from the group consisting of food, chemicals, biotherapeutics, vaccines, drugs, medical diagnostics, blood, blood products, cut flowers, and post harvest agricultural materials.

7. The device in claim 1, in which said device samples the temperature over various time periods and computes a function of temperature that is continually operative throughout the relevant temperature monitoring range of the device;
and wherein said function of temperature approximates the impact that the relevant temperature, for that period's length of time. has on a detectable property of said material;
and wherein said function of temperature resides with said device;
wherein the sums of said function of temperature are used to generate an elapsed lifetime number indicative of the remaining acceptable use lifetime of said material.

8. The device of claim 1, in which said means for calculating remaining storage lifetime are chemical means, in which one or more chemicals that, as a whole approximately duplicate the storage characteristics of the perishable material, are evaluated by the device and used to determine remaining storage lifetime.

9. The device of claim 1, in which the material is sterilized by heat treatment.

10. The device of claim 4, in which the material must have a minimal incubation thermal history.

11. The device of claim 4, in which said device contains additional sensors selected from the group consisting of sensors for shock, vibration, light, turbidity, or motion.

12. The device of claim 4, in which the material is a therapeutic protein drug, and the device is set to warn then the therapeutic protein drug has had a thermal history associated with increased risk of unwanted immunological activity.

13. The device of claim 4, in which the device is made pan of a drug injection pen or infusion pump.

14. A RFID tag device designed to be associated with a perishable material;
said device capable of outputting at least an electronic product code and user data from an onboard user data memory storage means;
said device having time monitoring means, calculation means, and sensors at least capable of monitoring temperature;
said device having means for continually calculating the material's remaining storage life;
said device additionally containing one or more preset fractional lifetime milestone values;
wherein said device compares said material's remaining storage life with said fractional lifetime milestone values arid determines when one or more of said milestone values have been reached;
wherein said device uses the result of said comparisons to determine if information derived from the output of said device's time monitoring means or said devices' temperature monitoring means should be stored in said device's user data memory storage means.

15. The RFID tag device of claim 14, in said device stores milestone data in said device's user data memory means; said milestone data consisting of one or more of milestone time data, or device sensor data obtained around the time that the particular milestone was reached.

16. The RFID tag device of claim 14, in which said device stores temperature or other sensor logger data in said device's user data memory means.

17. The RFID tag device of claim 14, in which the RFID tag is read by an RFID reader that does not have any preexisting knowledge of the material's time-temperature storage lifetime characteristics, and in which, after reading said RFID tag, said RFID reader now possesses said material's thermal history and fitness for use characteristics; and displays or stores such history and fitness for use characteristics, or communicates said history and fitness for use characteristics to another device.

18. The RFID tag device of claim 14, in which said RFID tag device contains additional sensors selected from the group consisting of humidity sensors, ethylene oxide sensors, or sensor for other environmental condition that impacts the fitness for use lifetime of said material, and said RFID tag device uses said comparisons between said material's remaining storage life and said fractional lifetime milestone values to additionally store data derived from said additional sensors into said device memory means.

19. The RFID tag device of claim 14, in which said device samples the temperature over various time periods and computes a function of temperature that is continually operative throughout the relevant temperature monitoring range of the device;
and wherein said function of temperature approximates the impact that the relevant temperature, for that period's length of time, has on a detectable property of said material; and wherein said function of temperature resides with said device;
wherein the sums of said function of temperature are used to generate an elapsed lifetime number indicative of the remaining acceptable use lifetime of said material.

20. The RFID tag device of claim 14, in which said means for calculating remaining storage lifetime are chemical means, in which one or more chemicals that, as a whole approximately duplicate the storage characteristics of the perishable material, are evaluated by the device and used to determine remaining storage lifetime, and in which the time monitoring means are provided by an external RFID tag reader device that sends current time data to the RFID tag.

21. The device of claim 14, in which the RFID tag is a passive RFID tag that derives its energy from the radio frequency signal produced by an RFID reader.

22. A method for automatically compressing or abstracting sensor data from a unitized perishable material monitor having environmental sensors,
calculation means, one or more preset fractional lifetime milestone values, and means for determining fractional remaining storage lifetime;
wherein the means for determining said fractional remaining storage lifetime resides with said monitor;
wherein said method compares said material's remaining storage lifetime with said fractional lifetime milestone values and determines when one or more of said milestone values have been reached;
wherein said method uses the result of said comparisons to determine if information derived from the output of one or more of said material monitor's sensors should be stored in the monitor's electronic memory.

23. The method of claim 22, in which said monitor stores milestone data in said monitor's memory; said milestone data consisting of one or more of milestone time data, or monitor sensor data obtained around the time that the particular milestone was reached.

24. The method of claim 22, in which said monitor stores temperature or other sensor logger data in said monitor's memory.

25. The method of in claim 22, in which said means for determining fractional remaining lifetime involve sampling the temperature over various time periods and computing a function of temperature that is continually operative throughout the relevant temperature monitoring range of the monitor;

and wherein said function of temperature approximates the impact that the relevant temperature, for that period's length of time, has on a detectable property of said perishable material;

and wherein said function of temperature resides with said monitor;

wherein the sums of said function of temperature are used to generate a fractional remaining storage lifetime number indicative of the remaining acceptable use lifetime of said material.

26. The method of claim 22, in which said means for determining fractional remaining lifetime are chemical means, in which one or more chemicals that, as a whole approximately duplicate the storage characteristics of the perishable material, are evaluated by the monitor and used to determine fractional remaining storage lifetime.

* * * * *